United States Patent
Ikeda et al.

(10) Patent No.: US 8,836,978 B2
(45) Date of Patent: Sep. 16, 2014

(54) IMAGE FORMING APPARATUS AND IMAGE FORMING SYSTEM HAVING A FIRST MEMORY AND A SECOND MEMORY

(75) Inventors: Junichi Ikeda, Miyagi (JP); Noriyuki Terao, Miyagi (JP); Satoru Numakura, Miyagi (JP); Hiroyuki Takahashi, Miyagi (JP); Tetsuya Satoh, Miyagi (JP); Koji Takeo, Miyagi (JP); Hideaki Yamamoto, Kanagawa (JP); Mitsuru Suzuki, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 249 days.

(21) Appl. No.: 13/344,167

(22) Filed: Jan. 5, 2012

(65) Prior Publication Data

US 2012/0170068 A1 Jul. 5, 2012

(30) Foreign Application Priority Data

Jan. 5, 2011 (JP) .................................. 2011-000683
Mar. 2, 2011 (JP) .................................. 2011-045745

(51) Int. Cl.
*G06K 15/00* (2006.01)
*G06K 15/02* (2006.01)

(52) U.S. Cl.
CPC ............ *G06K 15/02* (2013.01); *G06K 15/1814* (2013.01); *G06K 15/1801* (2013.01); *G06K 15/1863* (2013.01)
USPC ....... 358/1.15; 358/1.13; 358/1.16; 358/1.17; 370/389; 370/401

(58) Field of Classification Search
CPC ... G06K 15/02; G06K 15/00; G06K 15/1814; G06F 3/1285; G06F 3/1296

USPC .......................... 358/1.1–1.17; 370/389, 401
See application file for complete search history.

(56) References Cited

U.S. PATENT DOCUMENTS

| | | | | |
|---|---|---|---|---|
| 4,958,299 A | * | 9/1990 | Akada ............................. | 358/1.3 |
| 5,327,527 A | * | 7/1994 | Hatayama ....................... | 345/629 |
| 5,577,172 A | * | 11/1996 | Vatland et al. ................ | 358/1.15 |
| 5,873,659 A | * | 2/1999 | Edwards et al. ................ | 400/61 |
| 6,929,411 B2 | * | 8/2005 | Christiansen et al. .......... | 400/70 |
| 7,076,107 B1 | | 7/2006 | Terao | |

(Continued)

FOREIGN PATENT DOCUMENTS

| | | |
|---|---|---|
| JP | 2004-112410 | 4/2004 |
| JP | 4123993 | 5/2008 |

(Continued)

*Primary Examiner* — Dennis Dicker
(74) *Attorney, Agent, or Firm* — Oblon, Spivak, McClelland, Maier & Neustadt, L.L.P.

(57) ABSTRACT

An image forming apparatus receives raster image data transferred from an external device and forms an image on the basis of the received raster image data. The apparatus includes a processor that controls a transfer of the raster image data from the external device, a first memory connected to the processor through a first bus is used as a working area of the processor, a second memory that stores the raster image data, a memory control unit connected to the second memory through a second bus controls an operation of writing and reading the raster image data in and from the second memory, a printer engine that forms an image on the basis of the raster image data, and an engine control unit that reads the raster image data from the second memory through the memory control unit and supplies the printer engine with the read raster image data.

20 Claims, 20 Drawing Sheets

(56) References Cited

U.S. PATENT DOCUMENTS

| | | | |
|---|---|---|---|
| 7,239,753 B2 | 7/2007 | Terao | |
| 7,269,291 B2 | 9/2007 | Terao | |
| 7,454,540 B2 | 11/2008 | Oshikiri et al. | |
| 7,536,489 B2 | 5/2009 | Oshikiri et al. | |
| 7,664,904 B2 | 2/2010 | Oshikiri et al. | |
| 7,698,484 B2 | 4/2010 | Ikeda et al. | |
| 7,755,791 B2 | 7/2010 | Maita et al. | |
| 7,779,187 B2 | 8/2010 | Ikeda et al. | |
| 7,813,362 B2 | 10/2010 | Ikeda et al. | |
| 8,159,703 B2* | 4/2012 | Murase | 358/1.15 |
| 8,159,709 B2* | 4/2012 | Young et al. | 358/1.16 |
| 2002/0054339 A1* | 5/2002 | Arakawa | 358/1.15 |
| 2002/0061133 A1* | 5/2002 | Ohta et al. | 382/176 |
| 2003/0146946 A1* | 8/2003 | Takahashi | 347/9 |
| 2005/0248584 A1 | 11/2005 | Takeo et al. | |
| 2005/0254085 A1 | 11/2005 | Oshikiri et al. | |
| 2005/0254713 A1* | 11/2005 | Wakana | 382/232 |
| 2006/0114918 A1 | 6/2006 | Ikeda et al. | |
| 2006/0115183 A1* | 6/2006 | Ueda | 382/298 |
| 2006/0187944 A1 | 8/2006 | Takeo et al. | |
| 2006/0209722 A1 | 9/2006 | Takeo et al. | |
| 2007/0218870 A1 | 9/2007 | Satoh | |
| 2008/0016265 A1 | 1/2008 | Oshikiri et al. | |
| 2008/0137135 A1* | 6/2008 | Takeishi | 358/1.15 |
| 2010/0067042 A1 | 3/2010 | Ikeda et al. | |
| 2011/0225341 A1 | 9/2011 | Satoh et al. | |
| 2012/0293838 A1* | 11/2012 | Yamagami et al. | 358/1.15 |

FOREIGN PATENT DOCUMENTS

| | | |
|---|---|---|
| JP | 2008-193409 | 8/2008 |
| JP | 4261383 | 2/2009 |
| JP | 2009-151752 | 7/2009 |
| JP | 2010-99907 | 5/2010 |

* cited by examiner

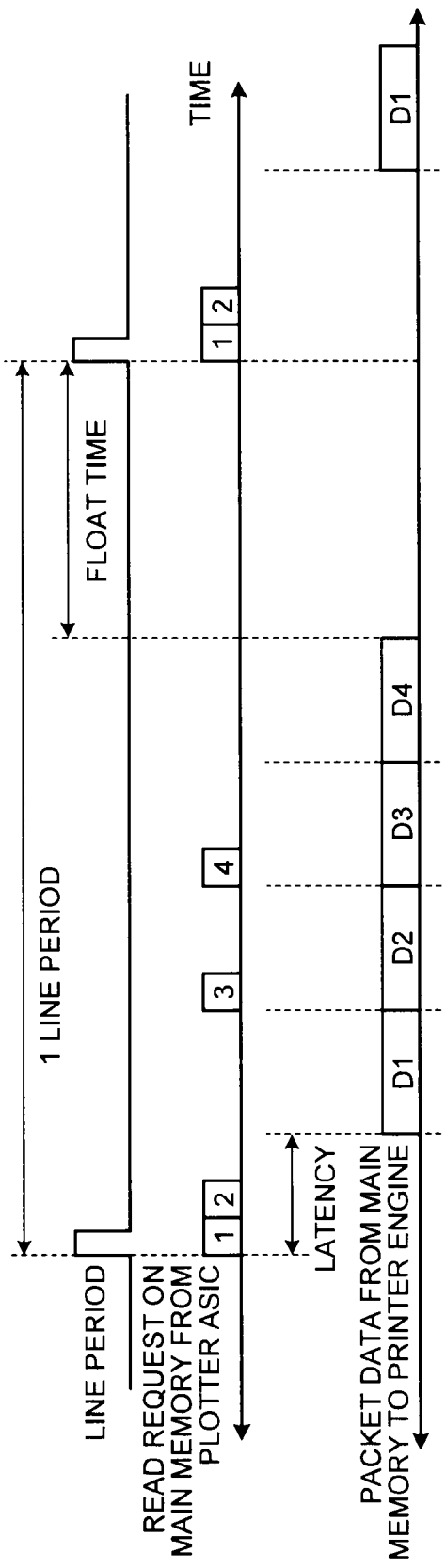

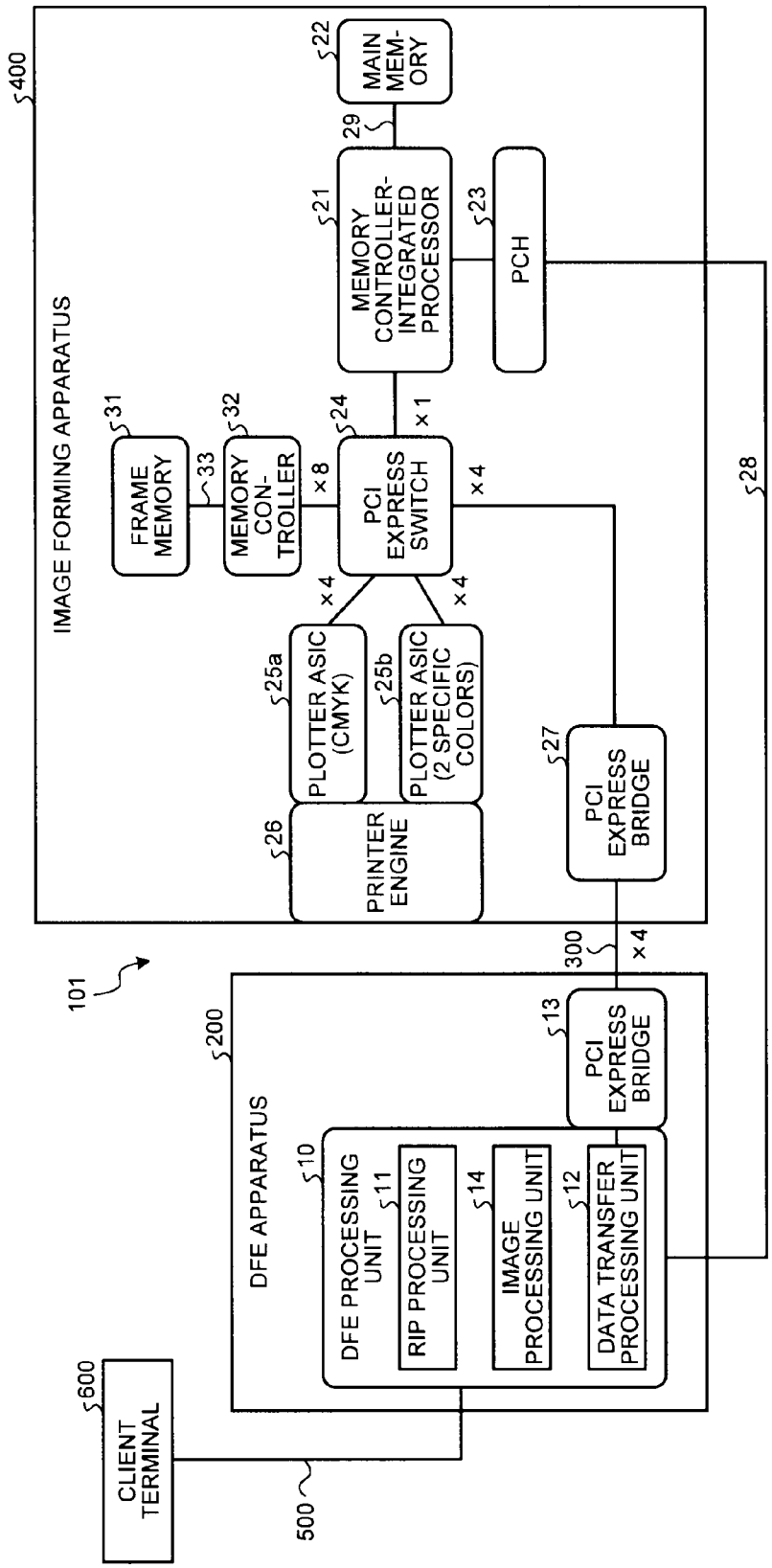

TIME

MINIMUM   AVERAGE   MAXIMUM

☐ FIRST EMBODIMENT
▨ COMPARATIVE EXAMPLE

IMAGE FORMING APPARATUS AND IMAGE FORMING SYSTEM HAVING A FIRST MEMORY AND A SECOND MEMORY

CROSS-REFERENCE TO RELATED APPLICATIONS

The present application claims priority to and incorporates by reference the entire contents of Japanese Patent Application No. 2011-000683 filed in Japan on Jan. 5, 2011 and Japanese Patent Application No. 2011-045745 filed in Japan on Mar. 2, 2011.

BACKGROUND OF THE INVENTION

1. Field of the Invention

An embodiment of the invention relates to an image forming apparatus and an image forming system.

2. Description of the Related Art

When printing is performed on the basis of image data of a page description language (PDL) format, the image data of the PDL format is developed into image data of a raster format (hereinafter, referred to as "raster image data"), and printing is performed on the basis of the raster image data. Image forming systems for large-volume printing business, which perform a process at a high speed, often employ a configuration in which a digital front end (DFE) apparatus and an image forming apparatus are separately provided. In the configuration, the EDF apparatus performs a raster image processing (RIP) process of generating raster image data on the basis of image data of a PDL format contained in a print job and the image forming apparatus prints an image on a sheet of paper as a recording medium on the basis of the raster image data. In this case, the DFE apparatus is connected to the image forming apparatus through a network or a high-performance serial bus, and the raster image data that has undergone the RIP process is transferred from the DFE apparatus to the image forming apparatus.

An example of such an image forming system is disclosed in Japanese Patent Application Laid-open No. 2010-99907. In the image forming system disclosed in Japanese Patent Application Laid-open No. 2010-99907, a general mother board for a personal computer (PC) is used as a DFE apparatus, and an image forming apparatus also employs a controller configuration in which a central processing unit (CPU) (processor) used for print control and a local memory are mounted. The raster image data generated by the DFE apparatus is transferred to the image forming apparatus, is then stored in the local memory, and finally supplied to a printer engine.

In the conventional image forming apparatus of the image forming system, a memory which is accessed by the processor for print control and used as a working area and a memory that stores the raster image data transferred from the DFE apparatus are shared on the same bus. However, depending on an operation of software operating on the processor, the processor may continue to preferentially perform memory access. In this case, an operation of writing/reading the raster image data to/from the memory is delayed, and printing performance degrades.

SUMMARY OF THE INVENTION

It is an object of the present invention to at least partially solve the problems in the conventional technology.

An image forming apparatus receives raster image data transferred from an external device and forms an image on the basis of the received raster image data. The image forming apparatus includes: a processor that controls a transfer of the raster image data from the external device; a first memory that is connected to the processor through a first bus and used as a working area of the processor; a second memory that stores the raster image data; a memory control unit that is connected to the second memory through a second bus and controls an operation of writing and reading the raster image data in and from the second memory; a printer engine that forms an image on the basis of the raster image data; and an engine control unit that reads the raster image data from the second memory through the memory control unit and supplies the printer engine with the read raster image data.

An image forming system includes a first apparatus that generates raster image data and a second apparatus that forms an image on the basis of the raster image data transferred from the first apparatus. The first apparatus includes: a generating unit that generates the raster image data on the basis of a print job; an image processing unit that performs image processing to edit the raster image data generated by the generating unit; and a transfer unit that transfers the raster image data that has been subjected to the image processing to the second apparatus. The second apparatus includes: a processor that controls transfer of the raster image data from the first apparatus; a first memory that is connected to the processor through a first bus and used as a working area of the processor; a second memory that stores the raster image data; a memory control unit that is connected to the second memory through a second bus and controls an operation of writing and reading the raster image data in and from the second memory; a printer engine that forms an image on the basis of the raster image data; and an engine control unit that reads the raster image data from the second memory through the memory control unit and supplies the printer engine with the read raster image data.

An image forming apparatus includes: a processor; a first memory that is accessed by the processor; a second memory that stores data; a relay unit that is connected to the processor and the second memory and transmits image data received from an external device to either of the processor and the second memory; and an image forming unit that forms an image a medium on the basis of the image data. The relay unit includes an address translating unit that performs an address translation between a first address space including an address space of the first memory and a second address space including an address space of the second memory. The relay unit stores, in the second memory, the image data in units of predetermined size smaller than the second memory size, a write request of which is issued from the external device with respect to a predetermined address contained in the first address space, while shifting the address by the predetermined size. The relay unit outputs the stored image data to the image forming unit when an amount of the input image data corresponding to the original image data size is stored in the second memory.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a timing chart illustrating an example of data transfer synchronized with one line period of an image forming apparatus;

FIG. 10 is a diagram illustrating a schematic configuration of an image forming system according to a first embodiment;

DETAILED DESCRIPTION OF THE PREFERRED EMBODIMENTS

Hereinafter, exemplary embodiments of an image forming apparatus and an image forming system according to the present invention will be described in detail with reference to the drawings. The following description will be made in connection with an example of an image forming system including a DFE apparatus as a first apparatus and an image forming apparatus as a second apparatus. An applicable apparatus (system) is not limited thereto.

Figure 1:
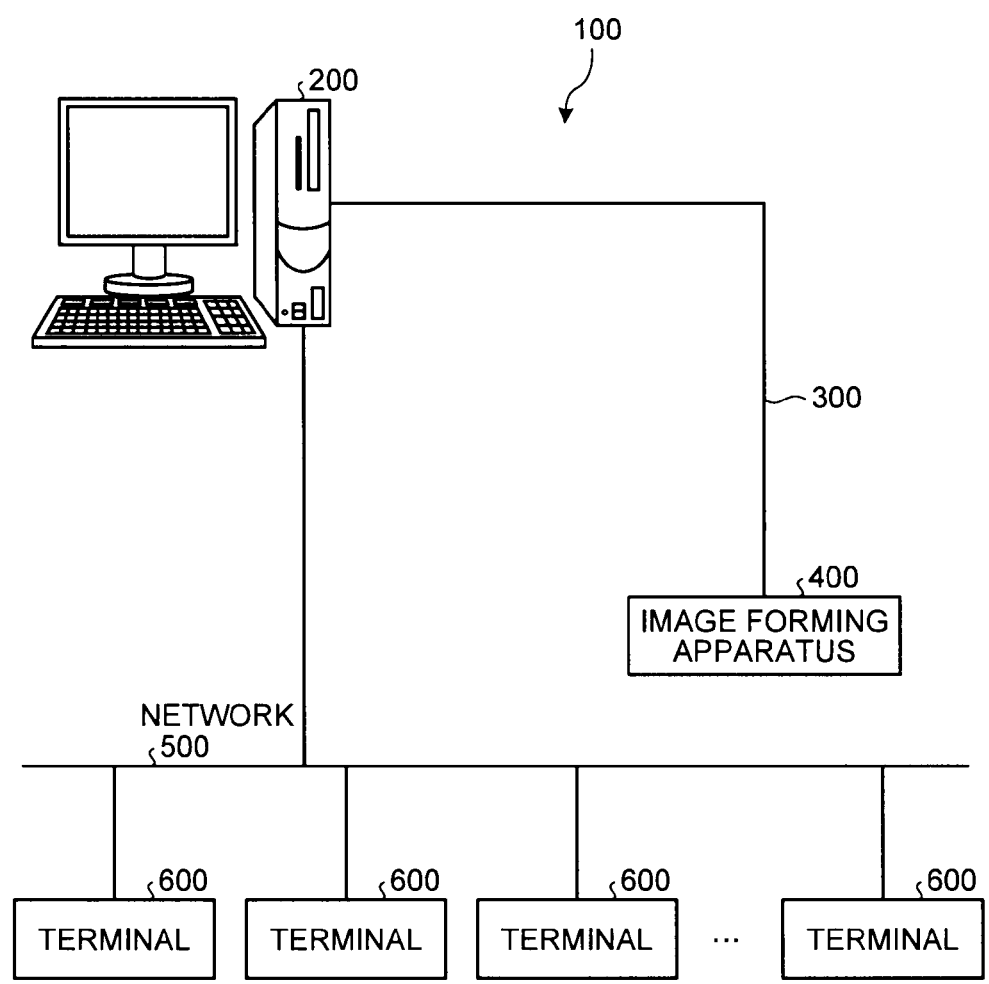
FIG. 1 is a schematic diagram illustrating a configuration of an image forming system of an embodiment.

FIG. 1 is a schematic configuration diagram illustrating an image forming system 100 of the present embodiment. The image forming system 100 includes a DFE apparatus 200 and an image forming apparatus 400 which is connected to the DFE apparatus 200 through a communication cable 300. The DFE apparatus 200 functions as a so-called print server and is connected to a plurality of terminals (client terminals) 600 used by users such as a PC through a network 500.

Figure 2:
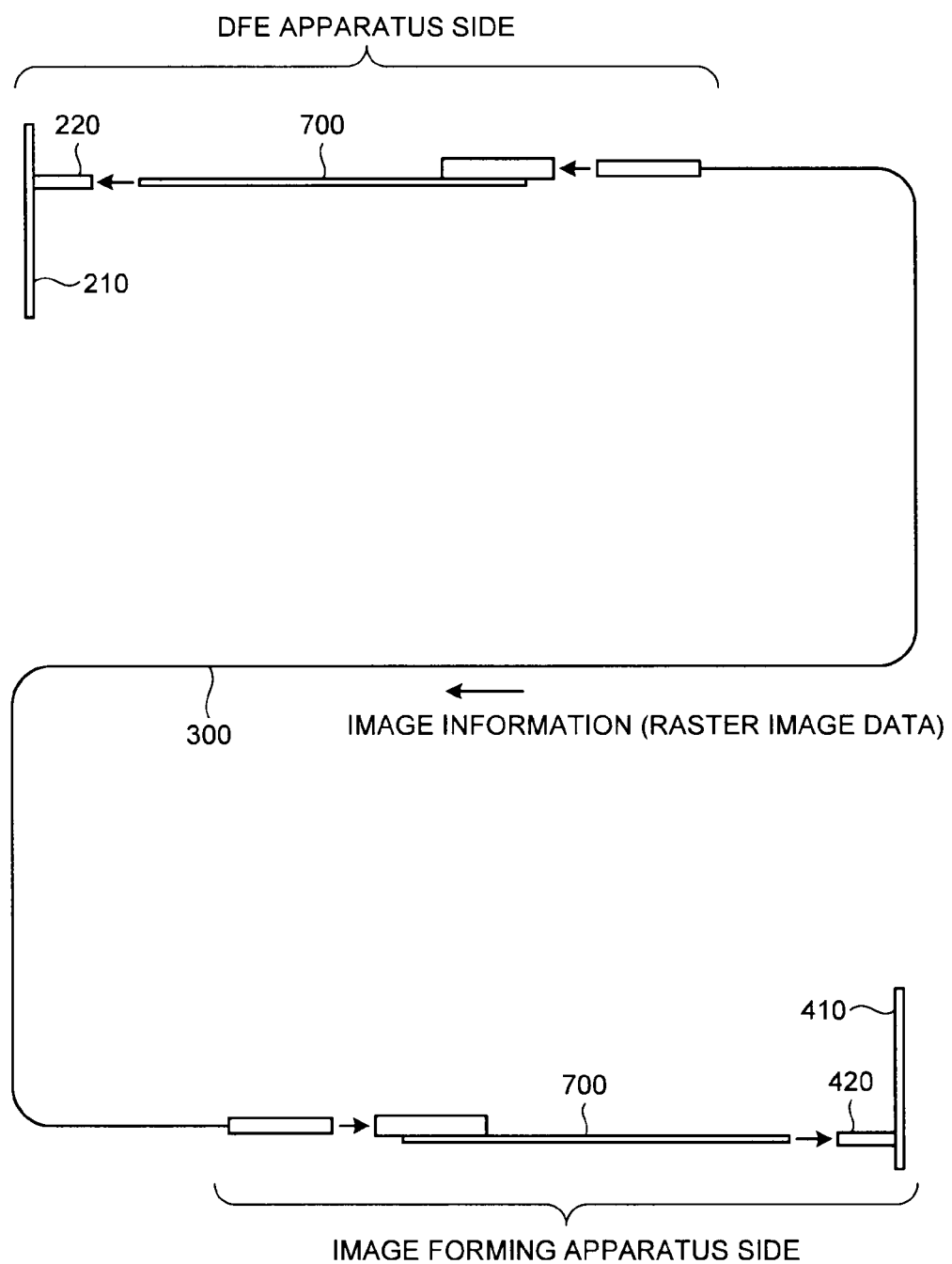
FIG. 2 is a diagram for describing a transmission path between a DFE apparatus and an image forming apparatus.

In the DFE apparatus 200, a slot 220 conforming to a PCI Express standard (hereinafter, referred to as "PCI Express slot") is mounted on a mother board 210 as illustrated in FIG. 2. A card adapter 700 is attached to the PCI Express slot 220.

In the image forming apparatus 400, a PCI Express slot 420 is mounted on a mother board 410 as illustrated in FIG. 2. A card adapter 700 is attached to the PCI Express slot 420.

The card adapter 700 at the DFE apparatus 200 side is connected to the card adapter 700 at the image forming apparatus 400 side through the communication cable 300. Thus, the DFE apparatus 200 and the image forming apparatus 400 are communicably connected to each other through the card adapters 700 and the communication cable 300, and high-speed information communication is performed between the DFE apparatus 200 and the image forming apparatus 400.

In the image forming system 100 of the present embodiment, image information (image information of black, image information of cyan, image information of magenta, and image information of yellow) is transferred from the DFE apparatus 200 to the image forming apparatus 400 in the form of raster image data. The image forming apparatus 400 forms a color image on the basis of the raster image data transferred from the DFE apparatus 200.

As the communication cable 300, there may be used various communication cables based on the PCI Express standard, including copper wire cables or optical active cables and cables capable of transmitting a high-speed differential signal.

Figure 3:
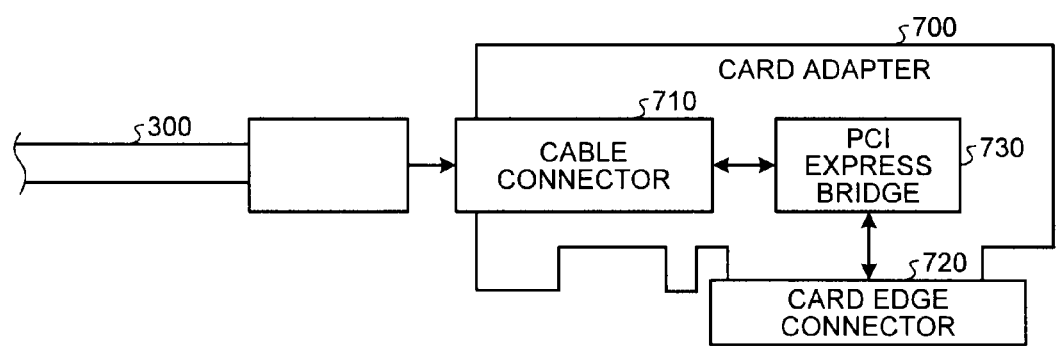
FIG. 3 is a schematic diagram illustrating the outline of a card adapter.

FIG. 3 is a schematic diagram illustrating the outline of the card adapter 700. The card adapter 700 has a common configuration between the DFE apparatus 200 side and the image forming apparatus 400 side. The card adapter 700 includes a cable connector 710, a card edge connector 720, and a PCI Express bridge 730 as illustrated in FIG. 3.

The cable connector 710 is a connector to which the communication cable 300 is attached. Further, the card edge connector 720 is a connector connected to a terminal of the PCI Express slot 220 or the PCI Express slot 420 when the card adapter 700 is attached to the PCI Express slot 220 or the PCI Express slot 420. Connectors that conform to the PCI Express standard are used as the cable connector 710 and the card edge connector 720.

The PCI Express bridge 730 is a bridge that relays data between the cable connector 710 and the card edge connector 720 and conforms to the PCI Express standard. A bridge of a non-transparent type is used as the PCI Express bridge 730. Since the DFE apparatus 200 is connected to the image forming apparatus 400 using the PCI Express bridge 730 of the non-transparent type, the DFE apparatus 200 and the image forming apparatus 400 can individually perform an initialization process without interfering with the other party's operation, and the processor of each apparatus can access the other party's resource while individually performing an operation.

Further, a switch having a clock isolation function is preferably used as the PCI Express bridge 730. The clock isolation function refers to a function of separating a clock domain by using a bridge as a boundary. Through the clock isolation function, a domain between the PCI Express bridge 730 at the DFE apparatus 200 side and the PCI Express bridge 730 at the image forming apparatus 400 side (a domain in which the raster image data is transferred through the communication cable 300) can be used as a clock domain independent of the other domains. A non-spread spectrum clock is used as a clock in the clock domain between the PCI Express bridge 730 at the DFE apparatus 200 side and the PCI Express bridge 730 at the image forming apparatus 400 side. A spread spectrum clock is used as a clock in the other clock domains. Thus, unnecessary radiation (electromagnetic interference (EMI)) can be reduced, and appropriate communication can be performed while synchronizing the DFE apparatus 200 with the image forming apparatus 400.

That is, the EMI can be effectively reduced by using the spread spectrum clock as a reference clock for operations of the DFE apparatus 200 and the image forming apparatus 400. However, when the spread spectrum clock is used as a clock for the whole image forming system 100, the DFE apparatus 200 is not synchronized with the image forming apparatus 400, and it is difficult to appropriately perform communication using the communication cable 300. On the other hand, when the clock domain between the PCI Express bridges 730 is separated through the clock isolation function of the PCI Express bridge 730 and the non-spread spectrum clock is used as a clock only for this clock domain, the EMI can be reduced in terms of the whole image forming system 100, and communication can be appropriately performed between the DFE apparatus 200 and the image forming apparatus 400 using the communication cable 300.

Next, more specific configuration examples (an embodiment) of the DFE apparatus 200 and the image forming apparatus 400 in the image forming system 100 of the present embodiment will be described in detail while comparing with a configuration example (a comparative example) to which the present invention is not applied.

COMPARATIVE EXAMPLE

First, a comparative example will be described with reference to FIGS. 4 to 9B. In the following description, in order to make clear a correspondence relation between a comparative example and an embodiment, among components configuring an image forming system according to the comparative example, components (including components that partially differ in function) that correspond to components of the embodiment are denoted by the same reference numerals as in the embodiment.

Figure 4:
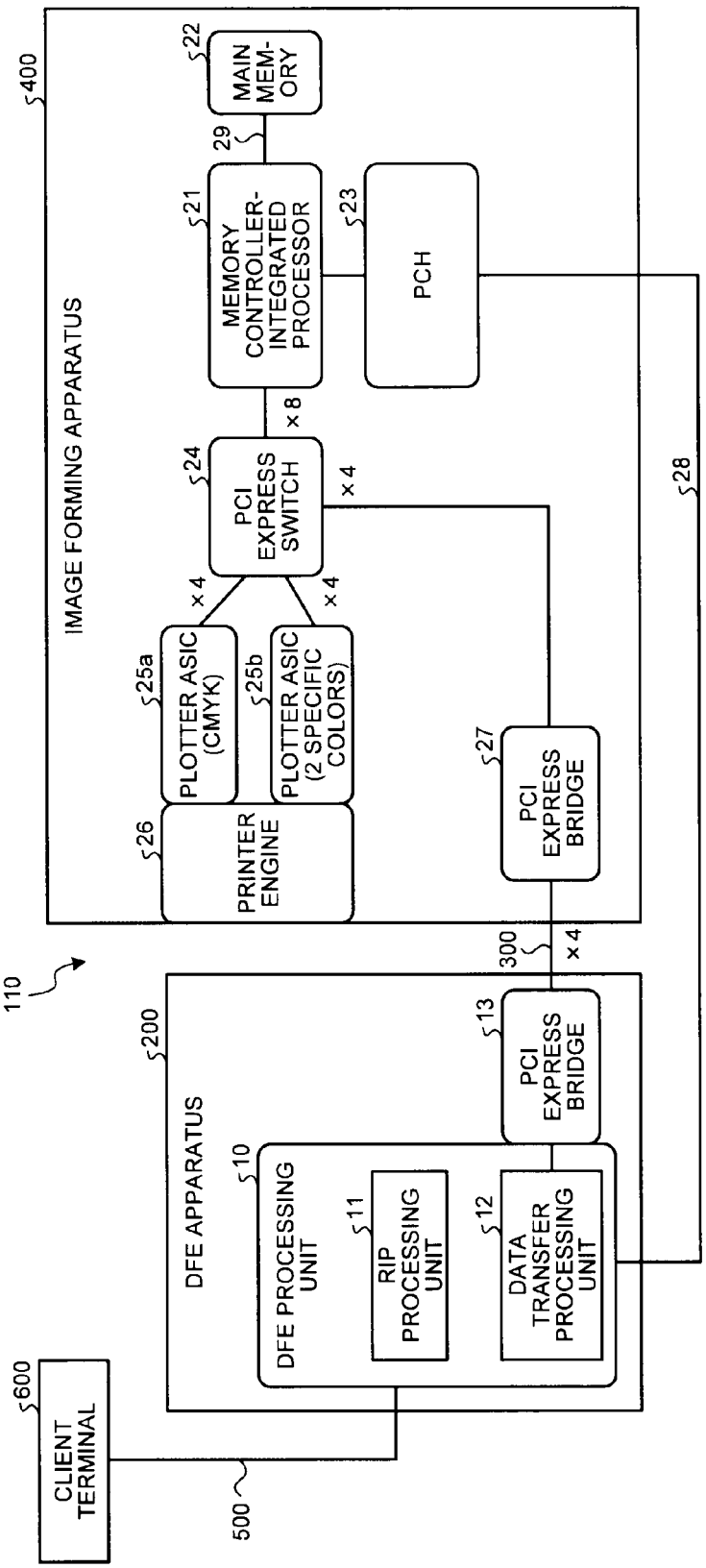
FIG. 4 is a diagram illustrating a schematic configuration of an image forming system according to a comparative example.
Figure 5:
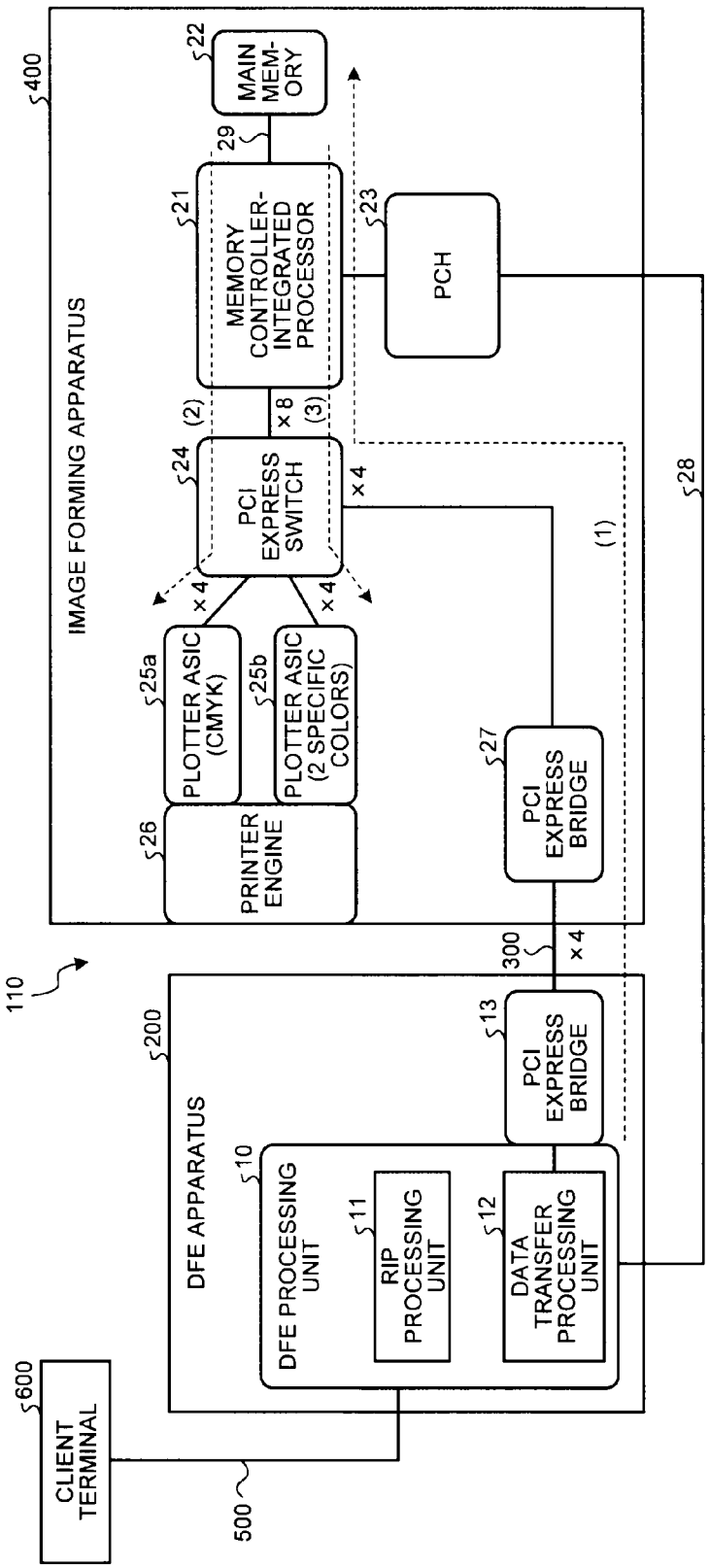
FIG. 5 is a diagram illustrating the flow of data in an image forming system according to a comparative example.

FIG. 4 is a diagram illustrating a schematic configuration of the image forming system according to the comparative example (hereinafter, referred to as "image forming system 110"), and FIG. 5 is a diagram illustrating a data flow in the image forming system 110 according to the comparative example. In the image forming system 110 according to the comparative example, the DFE apparatus 200 is connected with the image forming apparatus 400 through the communication cable 300 that conforms to the PCI Express standard. Further, a client terminal 600 used by a user such as a PC is connected to the DFE apparatus 200 through the network 500 such as a local area network (LAN).

The DFE apparatus 200 includes a DFE processing unit 10. The DFE processing unit 10 is a data processing unit, at the DFE apparatus 200 side, which is implemented using a processor and a memory (not illustrated). The DFE processing unit 10 includes a RIP processing unit 11 and a data transfer processing unit 12 as a main functional configuration.

The RIP processing unit 11 receives a print job transferred from the client terminal 600 through the network 500, and develops data of a PDL format contained in the print job into raster image data for printing. The raster image data generated by the RIP processing unit 11 is stored in a memory (not illustrated).

By the data transfer processing unit 12, the raster image data generated by the RIP processing unit 11 is read out page by page from the memory. The data transfer processing unit 12 performs a memory write transfer process. That is, the read out raster image data from the memory is transferred to the image forming apparatus 400 through the communication cable 300, in response to a write request (a write request to write data into the main memory 22 of the image forming apparatus 400, which is described later).

A card adapter (not illustrated) (which corresponds to the card adapter 700) is used for a connection with the communication cable 300. A PCI Express bridge 13 (which corresponds to the PCI Express bridge 730), to which the raster image data to be transferred to the image forming apparatus 400 through the communication cable 300 is input, is mounted on the card adapter. The raster image data passes through the PCI Express bridge 13 and is then transferred to the image forming apparatus 400 through the communication cable 300 according to a PCI Express protocol.

The number of PCI Express lanes used for the transfer of the raster image data is arranged so as to obtain a sufficient transfer band, depending on the size of the raster image data to be transferred and a required printing process speed. Here, the raster image data is transferred through 4 lanes (×4) as an example.

The image forming apparatus 400 includes a memory controller-integrated processor 21, the main memory 22, a PCH (platform controller hub) 23, a PCI Express switch 24 (it refers to a switch based on or compatible with the PCI Express standard), two plotter ASICs (Application Specific Integrated Circuits) 25a and 25b, and a printer engine 26.

Further, the image forming apparatus 400 is provided with a card adapter (not illustrated) (which corresponds to the card adapter 700) for a connection with the communication cable 300, similarly to the DFE apparatus 200. The raster image data transferred from the DFE apparatus 200 via the communication cable 300 in conformity with the PCI Express protocol is input to the apparatus 400 through a PCI Express bridge 27 (which corresponds to the PCI Express bridge 730) mounted on the card adapter.

The memory controller-integrated processor 21 executes a transfer control process for controlling the transfer of the raster image data from the DFE apparatus 200, a decompression process for decompressing the raster image data transferred as compressed data, image processing for image editing (rotation, enlargement, reduction, or the like) on the raster image data, and the like. The memory controller-integrated processor 21 uses the main memory 22 as a working area for executing various processing (software) including the transfer control process, the decompression process, and the image processing.

The memory controller-integrated processor 21 is connected to the DFE processing unit 10 of the DFE apparatus 200 through the PCH 23 and a control signal transmission cable 28, such as a Giga Ethernet (a registered trademark) cable, connected to the PCH 23. The transfer of the raster image data from the DFE apparatus 200 to the image forming apparatus 400 is executed in response to a control signal transmitted from the memory controller-integrated processor 21 through the control signal transmission cable 28 to the DFE processing unit 10. The control signal controls, for example, a start timing when the page-by-page transfer of the raster image data is started.

The main memory 22 is connected with the memory controller-integrated processor 21 through a first memory bus 29. The main memory 22 is used not only as the working area of the memory controller-integrated processor 21 but also as a memory storing the raster image data transferred from the DFE apparatus 200.

The PCI Express switch 24 is connected with the PCI Express bridge 27, the memory controller-integrated processor 21, the plotter ASIC 25a, and the plotter ASIC 25b, and performs packet routing among the PCI Express bridge 27, the memory controller-integrated processor 21, the plotter ASIC 25a, and the plotter ASIC 25b.

The plotter ASICs 25a and 25b read the raster image data from the main memory 22 line by line (per line in a main scanning direction) in synchronization with a printing speed (a paper feeding speed) of the printer engine 26. The plotter ASICs 25a and 25b transfer the raster image data of each line read from the main memory 22 to the printer engine 26 by a memory read transfer process for transferring data in response to a read request (a request to read data from the main memory 22). Further, the plotter ASICs 25a and 25b are configured to perform the memory read transfer process corresponding to four colors. The plotter ASIC 25a corresponds to four colors of CMYK, and the plotter ASIC 25b corresponds to a clear toner or two specific colors.

The printer engine 26 forms an image on a paper which is a recording medium, on the basis of the raster image data transferred at a line period by the plotter ASICs 25a and 25b.

Next, a description will be made in connection with the data flow of the raster image data in the image forming system 110 according to the comparative example.

The raster image data generated by the RIP processing unit 11 of the DFE apparatus 200 is transferred to the image forming apparatus 400, page by page, by the memory write transfer process performed by the data transfer processing unit 12, and is then stored in the main memory 22 of the image forming apparatus 400 (a path indicated by a dotted arrow (1) in FIG. 5). At this time, the PCI Express switch 24 of the image forming apparatus 400 relays the transfer of the raster image data between the PCI Express bridge 27 and the memory controller-integrated processor 21. The memory controller-integrated processor 21 stores the raster image data, which has been transferred from the DFE apparatus 200 through the communication cable 300, the PCI Express bridge 27, and the PCI Express switch 24, in the main memory 22 through the first memory bus 29.

Further, the transfer of the raster image data from the DFE apparatus 200 to the image forming apparatus 400 is typically performed in a state that the raster image data is compressed into lossless compressed data. In this case, the compressed raster image data is decompressed into original image data through the decompression process executed by the memory controller-integrated processor 21, and then stored in the main memory 22.

After the raster image data corresponding to one page is stored in the main memory 22, the plotter ASICs 25a and 25b of the image forming apparatus 400, in the memory read transfer process, read the raster image data from the main memory 22, line by line, in synchronization with the printing speed (the page feeding speed) of the printer engine 26, and transfer the read raster image data to the printer engine 26 (paths indicated by dotted arrows (2) and (3) in FIG. 5). At this time, the PCI Express switch 24 relays the transfer of the raster image data between the memory controller-integrated processor 21 and the plotter ASICs 25a and 25b. The plotter ASICs 25a and 25b acquire the raster image data, which has been read from the main memory 22 through the memory controller-integrated processor 21, through the PCI Express switch 24, and supply the printer engine 26 with the acquired raster image data.

As described above, in the image forming system 110 according to the comparative example, the printing process is executed by simultaneously performing the process of writing the raster image data, page by page, in the main memory 22 and the process of reading the raster image data, line by line, from the main memory 22 to supply the printer engine 26 with the read raster image data in a parallel manner.

Figure 6:
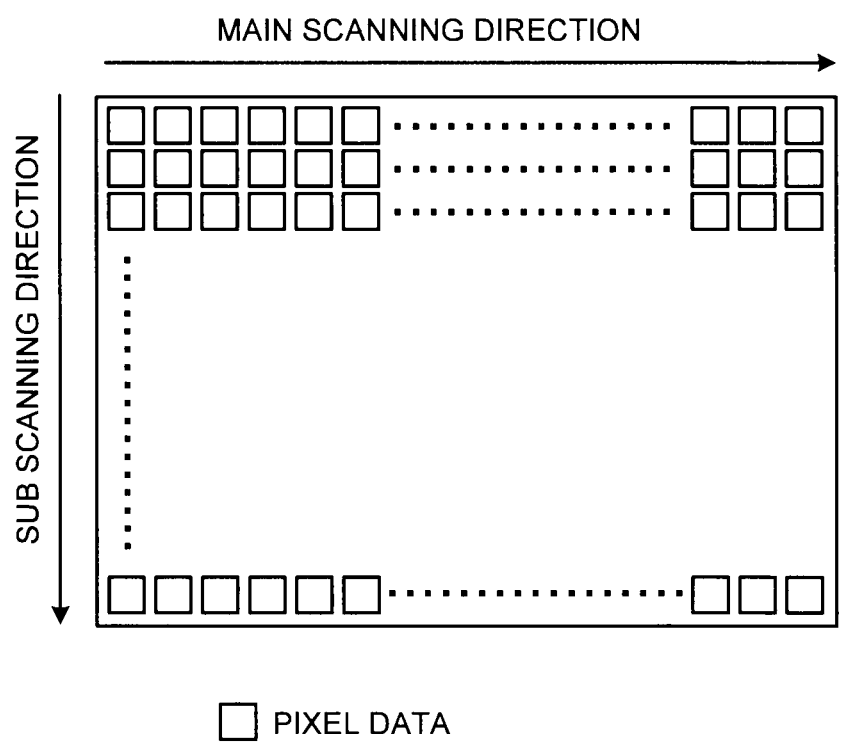
FIG. 6 is a diagram for describing a configuration of raster image data.

FIG. 6 is a diagram for describing a configuration of the raster image data. The raster image data is configured in a two-dimensional array of a main scanning direction and a sub scanning direction as illustrated in FIG. 6. The image forming system 110 according to the comparative example generates the raster image data illustrated in FIG. 6 through the RIP processing unit 11 of the DFE apparatus 200, and then transfers the generated raster image data to the main memory 22 of the image forming apparatus 400.

The data transfer from the main memory 22 to the printer engine 26 by the plotter ASICs 25a and 25b is executed by a synchronous transfer process performed such that a process of transferring image data in the main scanning direction at a set time period is repeated in the sub scanning direction.

Figure 7:
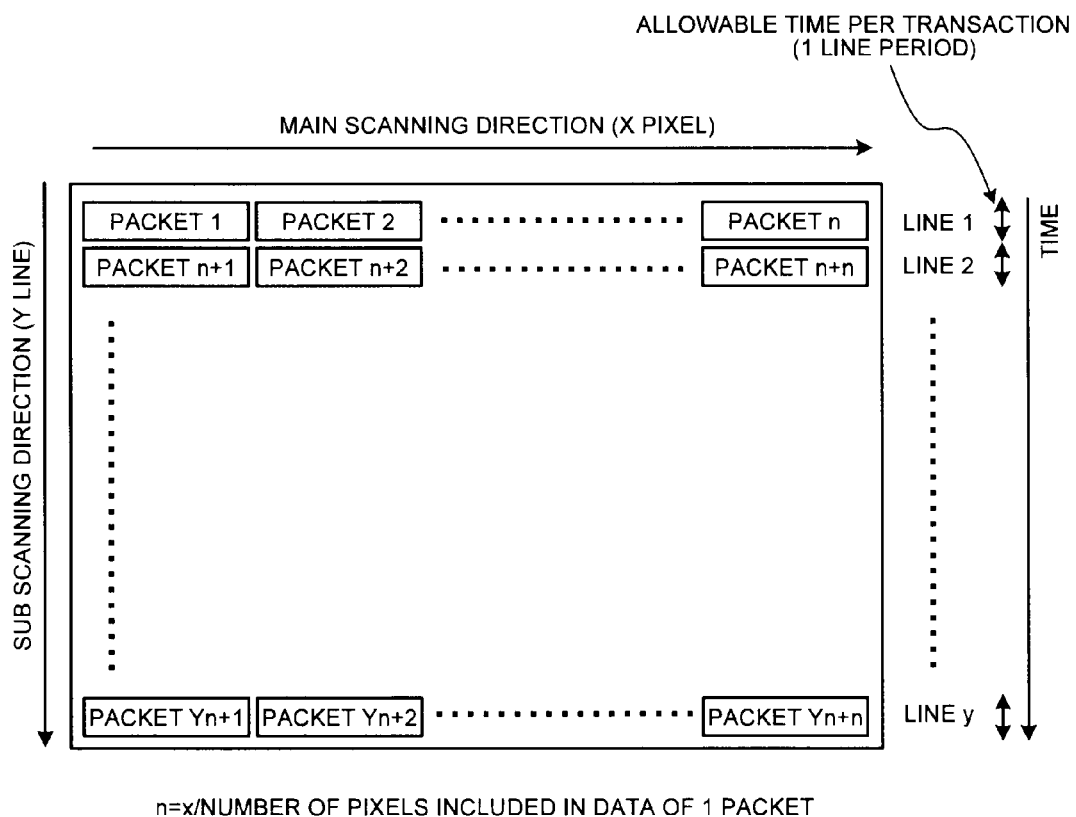
FIG. 7 is a diagram for describing a transaction in data transfer of an image forming apparatus.

FIG. 7 is a diagram for describing a transaction in the data transfer of the image forming apparatus 400. As for the data transfer in the image forming apparatus 400, as illustrated in FIG. 7, one line in the main scanning direction is made of a plurality of packets (n packets in this example) and each packet is made of a plurality of pixel data. These packets per line are required to be transferred as one transaction, in synchronization with the image scan speed in the sub scanning direction. A time duration allowed for one transaction is called as "one line period". The one line period is determined from the print image resolution and the feeding speed of the printer engine 26 as follows.

$$\text{One line period (s)} = 1/\{[\text{feeding speed (mm/s)}] \times [\text{number of pixels per 1 mm (/mm)}]\}$$

Further, when the image forming apparatus 400 is provided with a scanner engine, it is required to transfer the pixel data read by the scanner engine to the main memory 22, by the synchronous transfer process as mentioned above. In this case, one line period is determined from the read (scan) resolution and the moving speed of the head of the scanner as follows.

$$\text{One line period (s)} = 1/\{[\text{head moving speed (mm/s)}] \times [\text{number of pixels per 1 mm (/mm)}]\}$$

FIG. 8 is a timing chart illustrating an example of data transfer synchronized with one line period of the image forming apparatus 400. A description will be made in connection with an example in which a data amount corresponding to one line is transferred through 4 packets for simplified description.

The data transfer from the main memory 22 to the printer engine 26 by the plotter ASICs 25a and 25b is the synchronous transfer synchronized with one line period as mentioned above. The data transfer is executed in response to a read request (a request to read and transfer packet) from the plotter ASICs 25a and 25b to the main memory 22.

When all packet data (D1 to D4 in FIG. 8) corresponding to one line of the raster image data are transferred from the main memory 22 to the printer engine 26 within one line period, it is recognized that a line synchronization constraint has been satisfied. In the example of FIG. 8, the transfer of the packet data D1 to D4 is completed within one line period, and so the line synchronization constraint has been satisfied. A time between the completion of the transfer of the packet data D1 to D4 and the start of the next line period is a float time.

In the example of FIG. 8, since a response delay time or latency of the main memory 22 in response to the read request from the plotter ASICs 25a and 25b is short, the data transfer satisfying the line synchronization constraint can be performed. However, when the response delay time is long, the transfer of all packet data (D1 to D4 in FIG. 8) corresponding to one line of the raster image data is hardly to be completed within one line period. In this case, an error occurs in the printer engine 26, and an abnormal image is printed on the paper.

The line synchronization constraint is inherent in the data transfer in the image forming apparatus 400 that forms an image on a rapidly moving paper through the printer engine 26. For example, when the raster image data is transferred, page by page, from the DFE apparatus 200 to the image forming apparatus 400 as illustrated in the dotted arrow (1) of FIG. 5, such a constraint is not imposed. That is, when page-by-page data transfer is delayed, the number of printed sheets per time may be reduced. However, as for page-basis printing, the printer engine 26 can be temporarily stopped to wait until the page-by-page data transfer is completed. Thus, it does not lead to the occurrence of an error or printing of an abnormal image. However, when the line-by-line data transfer is delayed, it is difficult to suddenly stop a rapidly moving paper, and thus the line synchronization constraint must be satisfied.

Particularly, in image forming systems, used for large-volume printing business or the like, in which a printing process of a high speed and a high resolution is required, one line period is as very short as tens of micro seconds (μs), and a data amount corresponding to one line, which amounts to tens of kilo bytes, needs to be transferred within the short period. Thus, there is a need for a countermeasure capable of reliably satisfying the line synchronization constraint even in this situation.

As described above, it is important to reduce the response delay time of the main memory 22 in response to the read request as short as possible in order to satisfy the line synchronization constraint. However, in the image forming system 110 according to the comparative example, since the raster image data transferred from the DFE apparatus 200 to the image forming apparatus 400 is stored in the main memory 22 used as the working area of the memory controller-integrated processor 21, the response delay time of the main memory 22 in response to the read request is likely to increase.

That is, the memory controller-integrated processor 21 uses the main memory 22 as the working area and frequently accesses the main memory 22 through the first memory bus 29 in order to execute the transfer control process, the decompression process, the image processing, and the like. Further, the memory controller-integrated processor 21 executes software for controlling an operation of the whole image forming apparatus 400, such as a basic input-output system (BIOS), an operating system (OS), a print control application, or a display control application, using the main memory 22. For this reason, depending on an operation of software operated on the memory controller-integrated processor 21, the memory controller-integrated processor 21 continues to preferentially process memory access to the main memory 22, and this sometimes influences the response delay time of the main memory 22 in response to the read request to increase.

Figure 9A:
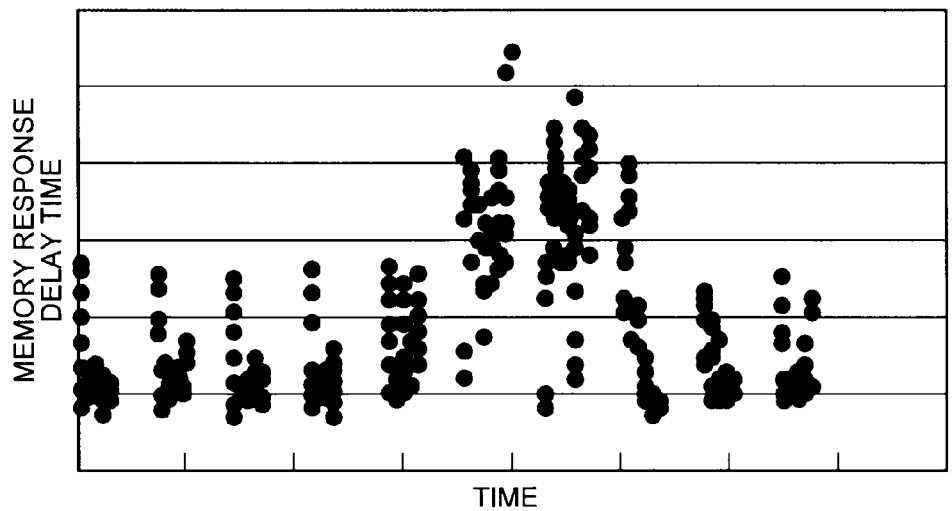
FIGS. 9A and 9B are diagrams illustrating results of measuring a main memory's response delay time to a read request and a time required for data transfer of one line in an image forming apparatus according to a comparative example.
Figure 9B:
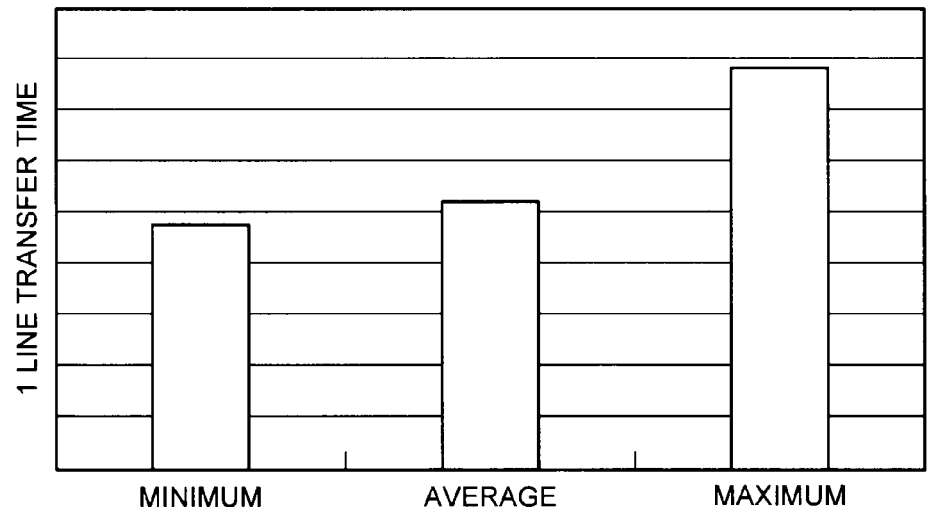

FIGS. 9A and 9B are diagrams illustrating results of measuring a response delay time of the main memory 22 in response to a read request and a time required for data transfer of one line in the image forming apparatus 400 having the configuration of FIG. 4, respectively.

A graph of FIG. 9A illustrates the distribution of the response delay time of the main memory 22 in response to the read request, and a mass of plots represent a group of packets for transferring data corresponding to one line. First 4 lines stay in a constant response delay time, and correspond to lines which are not affected by memory access by the memory controller-integrated processor 21. However, a mass of plots of 5th to 8th lines shows that the memory response delay time increases due to influence of memory access by the memory controller-integrated processor 21. Such an increase in the memory response delay time is caused depending on various factors such as a cache memory operation or an energy saving mode transition process executed by the memory controller-integrated processor 21 as well as influence of application software. Thus, it is very difficult to suppress it from occurring during the data transfer, and it is also difficult to anticipate when it occurs.

A graph of FIG. 9B illustrates contradistinction between a minimum value, an average value, and a maximum value of a data transfer time corresponding to one line when the raster image data corresponding to one page is transferred from the main memory 22 to the printer engine 26. The data transfer time increases in lines in which the response delay time increases. In the example of FIG. 9B, it can be understood that the average value of the data transfer time corresponding to one line is close to the minimum value, and the frequency that the response delay time increases is low. However, even though an increase in the response delay time rarely occurs, when the maximum value of the data transfer time corresponding to one line is longer than one line period, an error occurs in the printer engine 26. That is, in order to prevent an error from occurring in the printer engine 26, a high-speed operation has not to be performed at the speed at which one line period is shorter than the maximum value of the data transfer time corresponding to one line.

Further, since behavior of the response delay time may drastically change due to a change in software or a change in a chip set, even though the line period is designated to be longer than an actually measured maximum value, it is difficult to guarantee that the line synchronization constraint is completely satisfied. For this reason, it is necessary to use a chip set having extremely high performance or to increase a PCI Express connection band more than necessary in order to ensure a sufficient performance. However, there is a problem in that this is obstructive to a high-speed operation and a cost reduction.

Further, in the measurement of this example, the one line period to transfer the data was set to be longer by approximately 30% with respect to the typical response delay time. However, after a thousand of lines was transferred, the response delay time increased. Thereby, the line synchronization error occurred. The graph of FIG. 9A was derived by extracting data corresponding to several lines when the error occurred.

[First Embodiment]

Next, a first embodiment will be described with reference to FIGS. 10 to 12B. In an image forming system according to the first embodiment (hereinafter, referred to as an "image forming system 101"), the data flow and the memory for storing the raster image data when the raster image data developed by the DFE apparatus 200 is transferred to the printer engine 26 is separated from the data flow and the main memory 22 accessed by the memory controller-integrated processor 21 in the image forming apparatus 400. Thereby, these data transfers are not interfered by each other.

Figure 11:
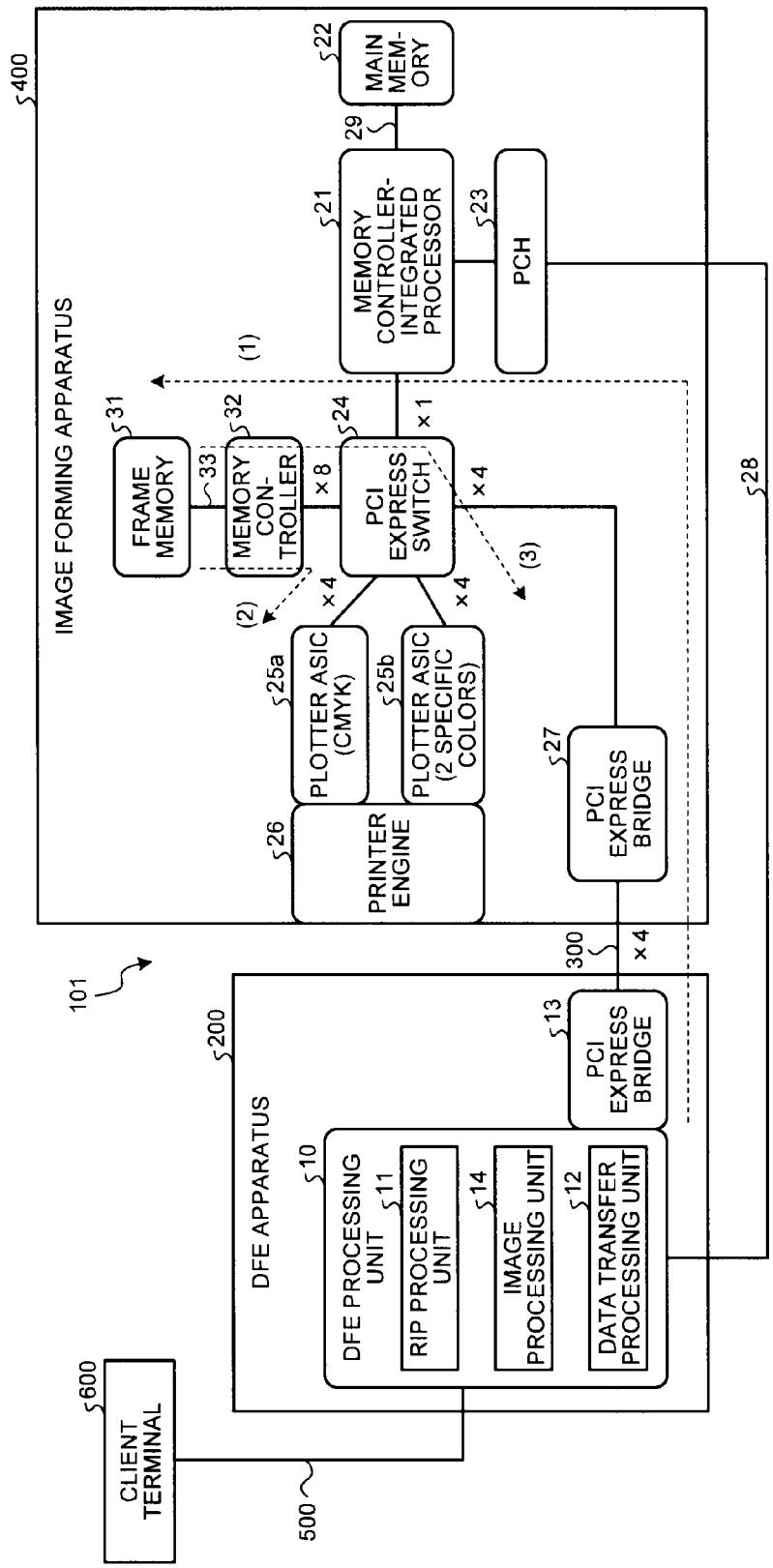
FIG. 11 is a diagram illustrating the flow of data in the image forming system according to the first embodiment.

FIG. 10 is a diagram illustrating a schematic configuration of the image forming system 101 according to the first embodiment, and FIG. 11 is a diagram illustrating a data flow in the image forming system 101 according to the first embodiment. In the image forming system 101 according to the first embodiment, the DFE apparatus 200 is connected with the image forming apparatus 400 through a communication cable 300 that conforms to the PCI Express standard, similarly to the comparative example. Further, a client terminal 600 used by a user such as a PC is connected to the DFE apparatus 200 through a network 500 such as a local area network (LAN).

The DFE apparatus 200 includes a DFE processing unit 10. The DFE processing unit 10 is a data processing unit, at the DFE apparatus 200 side, which is implemented using a processor and a memory (not shown). The DFE processing unit 10 includes as main functional components not only a RIP processing unit 11 and a data transfer processing unit 12, which are the same as in the comparative example, but also an image processing unit 14 that performs image processing for image editing on raster image data generated by the RIP processing unit 11.

The RIP processing unit 11 receives a print job transferred from the client terminal 600 through the network 500, and develops data of a PDL format contained in the print job into raster image data for printing, similarly to the comparative example.

The image processing unit 14 performs the image processing for image editing, such as image rotation, enlargement, and reduction, on the raster image data generated by the RIP processing unit 11. The raster image data which has been subjected to the image processing by the image processing unit 14 is stored in a memory (not shown).

On the page basis, the data transfer processing unit 12 extracts the raster image data after subjected to the image processing by the image processing unit 14 from the memory, and transfers the raster image data to the image forming apparatus 400 through the communication cable 300 by the memory write transfer process as described above.

A card adapter (not shown) (which corresponds to the card adapter 700) is used for a connection with the communication cable 300, similarly to the comparative example. A PCI Express bridge 13 (which corresponds to the PCI Express bridge 730) to which the raster image data to be transferred to the image forming apparatus 400 through the communication cable 300 is input is attached to the card adapter. Thus, the raster image data is transferred via the PCI Express bridge 13 to the image forming apparatus 400 through the communication cable 300 in conformity with the PCI Express protocol.

The number of PCI Express lanes used for the transfer of the raster image data is arranged so as to obtain a sufficient transfer band, depending on the size of the raster image data to be transferred and a required printing process speed. Here, the raster image data is transferred through 4 lanes (×4) as an example. Further, in the image forming system 101 according to the first embodiment, the raster image data is transferred from the DFE apparatus 200 to the image forming apparatus 400 in an uncompressed state.

The image forming apparatus 400 includes a memory controller-integrated processor 21, a main memory 22, a PCH 23, a PCI Express switch 24, two plotter ASICs 25a and 25b, and a printer engine 26, similarly to the comparative example. In addition to these components, the image forming apparatus 400 according to the first embodiment further includes a frame memory 31 that stores the raster image data transferred from the DFE apparatus 200, and a memory controller 32 that controls an operation of writing and reading the raster image data in and from the frame memory 31.

Further, the image forming apparatus 400 is provided with a card adapter (not shown) (which corresponds to the card adapter 700) for a connection with the communication cable 300, similarly to the comparative example. The raster image data transferred from the DFE apparatus 200 through the communication cable 300 according to the PCI Express protocol is input through a PCI Express bridge 27 (which corresponds to the PCI Express bridge 730) mounted on the card adapter.

In the first embodiment, a bridge of a non-transparent type is used as both the PCI Express bridge 13 at the DFE apparatus 200 side and the PCI Express bridge 27 at the image forming apparatus 400 side. That is, in the image forming system 101 according to the first embodiment, since the bridges of the non-transparent type are connected to each other by the communication cable 300, host-to-host communication can be performed between the DFE apparatus 200 and the image forming apparatus 400.

In this case, the PCI Express bridge 27 at the image forming apparatus 400 side is in a non-transparent status when seen from the DFE apparatus 200 side, and the PCI Express bridge 13 at the DFE apparatus 200 side is in a non-transparent status when seen from the image forming apparatus 400 side. Thus, when the image forming system 101 is activated, the image forming system 101 is normally activated regardless whether the DFE apparatus 200 side first starts or the image forming apparatus 400 side first starts, and there is no constraint to the start order at the time of activation. Further, even though the communication cable 300 falls out during an operation after activation, the system does not hang up. Further, when communication is performed between the DFE apparatus 200 and the image forming apparatus 400, address translation needs to be performed between the DFE apparatus 200 and the image forming apparatus 400. However, besides an address space of the DFE apparatus 200 and an address space of the image forming apparatus 400, a common address space (an NT space) can be set to the bridges of the non-transparent type (the PCI Express bridges 13 and 27). Further, since the NT space can be fixed, address translation with the NT space can be performed by both the DFE apparatus 200 side and the image forming apparatus 400 side, and thus address translation can be easily performed.

Further, in the first embodiment, a bridge having the clock isolation function is used as both the PCI Express bridge 13 at the DFE apparatus 200 side and the PCI Express bridge 27 at the image forming apparatus 400 side. A clock domain between the PCI Express bridge 13 and the PCI Express bridge 27 is set as an independent clock domain. A spread spectrum clock is used as a clock in the other domains excluding the domain between the PCI Express bridge 13 and the PCI Express bridge 27. A non spread spectrum clock is used as a clock in the clock domain between the PCI Express bridge 13 and the PCI Express bridge 27. Thus, unnecessary radiation (EMI) can be reduced, and appropriate communication can be performed while synchronizing the DFE apparatus 200 with the image forming apparatus 400.

The memory controller-integrated processor 21 executes, for example, a transfer control process for controlling the transfer of the raster image data from the DFE apparatus 200. The memory controller-integrated processor 21 uses the main memory 22 as the working area in which various processing (software) including the transfer control process are executed. Further, in the first embodiment, the raster image data is transferred from the DFE apparatus 200 to the image forming apparatus 400 in the uncompressed state, and the image processing for image editing on the raster image data is performed at the DFE apparatus 200 side. Thus, the memory controller-integrated processor 21 does not perform the decompression process of decompressing the raster image data, and the image processing for editing images of the raster image data.

The memory controller-integrated processor 21 is connected to the DFE processing unit 10 of the DFE apparatus 200 through the PCH 23 and a control signal transmission cable 28 connected to the PCH 23. The transfer of the raster image data from the DFE apparatus 200 to the image forming apparatus 400 is executed in response to a control signal transmitted from the memory controller-integrated processor 21 to the DFE processing unit 10 through the control signal transmission cable 28. The control signal controls, for example, a start timing when the page-by-page transfer of the raster image data is started.

The main memory 22 is connected with the memory controller-integrated processor 21 through a first memory bus 29, similarly to the comparative example. The main memory 22 is used as the working area of the memory controller-integrated processor 21. In the first embodiment, the raster image data transferred from the DFE apparatus 200 is stored in not the main memory 22 but the frame memory 31 connected to the memory controller 32.

The PCI Express switch 24 is connected with the PCI Express bridge 27, the memory controller 32, the plotter ASIC 25a, the plotter ASIC 25b, and the memory controller-integrated processor 21, and performs packet routing between the PCI Express bridge 27, the memory controller 32, the plotter ASIC 25a, the plotter ASIC 25b, and the memory controller-integrated processor 21.

Further, in the first embodiment, the number of connection lanes between the memory controller-integrated processor 21 and the PCI Express switch 24 is set to a minimal one lane connection (×1). It is because in the case of the first embodiment, the raster image data is not transferred between the memory controller-integrated processor 21 and the PCI Express switch 24. And, only a register setting packet for setting an address of descriptor or one line size by the memory controller-integrated processor 21 to the plotter ASICs 25a and 25b is transferred between the memory controller-integrated processor 21 and the PCI Express switch 24.

The plotter ASICs 25a and 25b read the raster image data from the frame memory 31 line by line (per line in a main scanning direction) in synchronization with a printing speed (a paper feeding speed) of the printer engine 26, and transfer the read raster image data to the printer engine 26, through the memory read transfer process. Further, the plotter ASICs 25a and 25b are configured to perform the memory read transfer process corresponding to four colors. The plotter ASIC 25a corresponds to four colors of CMYK, and the plotter ASIC 25b corresponds to a clear toner or two specific colors.

The printer engine 26 forms an image on a paper which is a recording medium, on the basis of the raster image data transferred at a line period by the plotter ASICs 25a and 25b.

The frame memory 31 is configured with a double data rate synchronous dynamic random access memory (DDRSRAM) or the like, and stores the raster image data page by page, transferred from the DFE apparatus 200. The frame memory 31 is connected to the memory controller 32 through a second memory bus 33.

The memory controller 32 controls an operation of writing and reading the raster image data in and from the frame memory 31. The memory controller 32 is connected with the frame memory 31 through the second memory bus 33, and is connected with the PCI Express switch 24. The memory controller 32 may be implemented, for example, using an ASIC having a PCI Express connection port and a DDR memory bus (the second memory bus 33), or a general-purpose high-speed FPGA (field programmable gate array) mounted with a high-speed IO compatible with PCI Express and DDR memory bus.

The number of connection lanes between the memory controller 32 and the PCI Express switch 24 is arranged so as to secure a band broader than a band required by the two plotter ASICs 25a and 25b. In the first embodiment, each of the plotter ASICs 25a and 25b has 4 lane connections (×4), and so the number of connection lanes between the memory controller 32 and the PCI Express switch 24 is set to 8 lane connections (×8).

Next, a description will be made in connection with the data flow of the raster image data in the image forming system 101 according to the first embodiment.

The raster image data generated by the RIP processing unit 11 of the DFE apparatus 200 is subjected to the image processing by the image processing unit 14, and then transferred page by page to the image forming apparatus 400 via the PCI Express bridge 13 and the communication cable 300 in the uncompressed state by the memory write transfer process performed by the data transfer processing unit 12. The raster image data transferred from the DFE apparatus 200 to the image forming apparatus 400 is input to the memory controller 32 via the PCI Express bridge 27 and the PCI Express switch 24. Then, the raster image data is written in the frame memory 31 by the memory controller 32 (a path indicated by a dotted arrow (1) in FIG. 11).

At this time, the PCI Express switch 24 of the image forming apparatus 400 relays the transfer of the raster image data between the PCI Express bridge 27 and the memory controller 32. The memory controller 32 stores the raster image data, which has been transferred from the DFE apparatus 200 through the communication cable 300, the PCI Express bridge 27, and the PCI Express switch 24, in the frame memory 31 through the second memory bus 33.

After the raster image data corresponding to one page is stored in the frame memory 31, the plotter ASICs 25a and 25b of the image forming apparatus 400 read the raster image data line by line from the frame memory 31 in synchronization with the printing speed (the page feeding speed) of the printer engine 26 by the memory read transfer process, and transfer the read raster image data to the printer engine 26 (paths indicated by dotted arrows (2) and (3) in FIG. 11). At this time, the PCI Express switch 24 relays the transfer of the raster image data between the memory controller 32 and the plotter ASICs 25a and 25b. The plotter ASICs 25a and 25b acquire the raster image data, which has been read from the frame memory 31 through the memory controller 32, through the PCI Express switch 24, and supply the printer engine 26 with the acquired raster image data.

As described above, in the image forming system 101 according to the first embodiment, the printing process is executed by simultaneously performing the process of writing the raster image data page by page in the frame memory 31 and the process of reading the raster image data line by line from the frame memory 31 and supplying the printer engine 26 with the read raster image data in a parallel manner.

In the image forming system 101 according to the first embodiment, when the memory controller-integrated processor 21 performs various processing with software, the memory controller-integrated processor 21 does not use a path or a memory (the frame memory 31) to which the raster image data is transferred. Thus, the line synchronization transfer performance of the printer engine 26 is not affected by an operation of software executed by the memory controller-integrated processor 21, and design limit performances of the plotter ASICs 25a and 25b and the printer engine 26 can be guaranteed. Accordingly, the image forming system 101 according to the first embodiment can perform an operation of writing and reading the raster image data in and from the frame memory 31 at a high speed and thus obtain high printing performance.

Figure 12A:
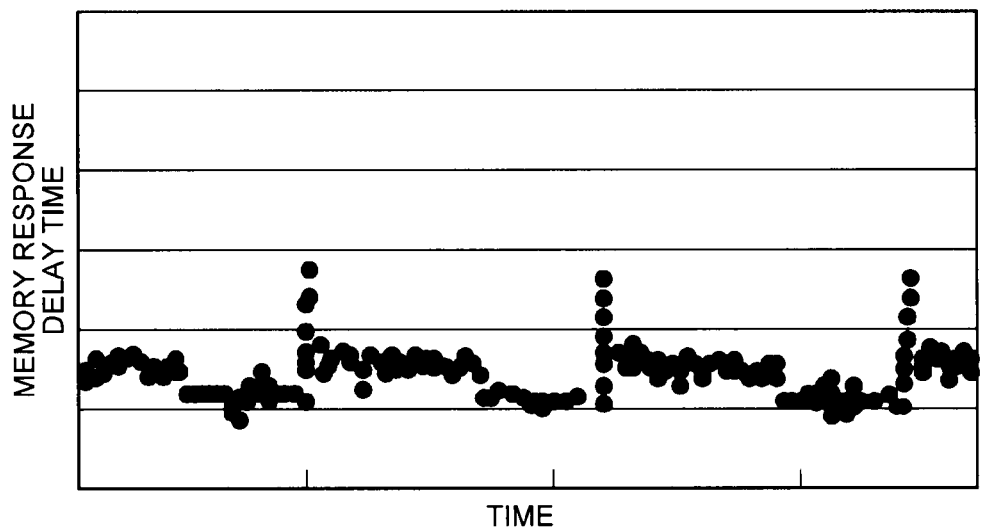
FIGS. 12A and 12B are diagrams illustrating results of measuring a frame memory's response delay time to a read request and a time required for data transfer of one line in the image forming apparatus according to the first embodiment.
Figure 12B:
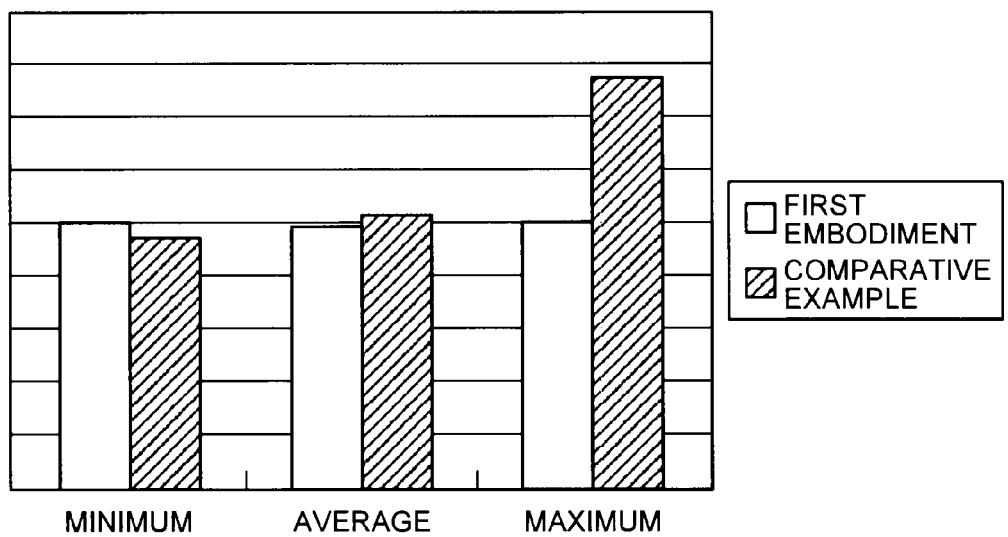

FIGS. 12A and 12B are diagrams illustrating results of measuring a response delay time of the frame memory 31 in response to a read request and a time required for data transfer of one line in the image forming apparatus 400 having the configuration of FIG. 10 according to the first embodiment, respectively.

A graph of FIG. 12A illustrates the distribution of the response delay time of the frame memory 31 in response to the read request, and plot patterns of one period represents a group of packets for transferring data corresponding to one line. In the graph of FIG. 12A, data corresponding to two lines is enlarged (the graph of FIG. 12A differs from the graph illustrated in FIG. 9A in the scale of a time on a horizontal axis). It can be seen that even though data corresponding to several pages is transferred, the same plot patterns are obtained in all lines. Further, it can be understood that an increase in the response delay time has been effectively suppressed when compared to that of the comparative example illustrated in FIG. 9A. The plot patterns temporarily rise in the beginning portion of the line. However, it is because read request packets are queued in a buffer in the memory controller 32, and it outwardly looks as if the response delay time has increased. The increase in the response delay time in the line beginning portion inevitably occurs, but does not affect an increase in the line transfer time.

A graph of FIG. 12B illustrates contradistinction between a minimum value, an average value, and a maximum value of a data transfer time corresponding to one line when the raster image data corresponding to one page is transferred from the frame memory 31 to the printer engine 26. In FIG. 12B, the graph of the comparative example illustrated in FIG. 9B is illustrated together as a comparison target. As can be seen from the graph of FIG. 12B, in the comparative example, since the maximum value is larger than the minimum value and the average value, a high-speed operation is hardly performed at the speed at which one line period is shorter than the maximum value in order to prevent an error from occurring in the printer engine 26. On the other hand, in the first embodiment, the average value and the maximum value are almost equal to the minimum value, and thus the line transfer period can be designed at limit performance of hardware.

The line transfer time corresponds to the number of sheets printed by the printer engine 26 per minute. It is assumed that a printer of the comparative example in which one line period is designed on the basis of the maximum value of the line transfer time shows the performance of 100 pages per minute. In this case, as can be seen from the graph illustrated in FIG. 12B, the performance of about 135 pages per minute can be realized in the first embodiment, and the speed can be improved by about 35% compared to the comparative example.

Further, in the configuration of the first embodiment, since there is no possibility that behavior of the response delay time will drastically change due to a change in software or a change in a chip set, it is not necessary to use a high performance chip set or to increase a PCI Express connection band more than necessary in order to ensure a sufficient performance. Thus, there is an effect capable of realizing both a high-speed operation and a low cost.

In the configuration example illustrated in FIG. 10, the chip set using the high-speed memory controller-integrated processor 21 has been exemplarily described as the processor for executing the transfer control process and the like. However, a lower cost embedded processor may be used as the processor for executing the transfer control process. When the low cost embedded processor is used for the transfer control process as described above, the cost of the entire system can be reduced even in a configuration in which the memory controller 32 is separately connected to the PCI Express switch 24.

Further, in the image forming system 101 according to the first embodiment, the DFE apparatus 200 side is provided with the image processing unit 14 that performs the image process for the image editing (rotation, enlargement, reduction, or the like) on the raster image data, and the raster image data which has been subjected to the image processing for the image editing is transferred from the DFE apparatus 200 to the image forming apparatus 400. Thus, the image forming apparatus 400 side needs not perform coordination between the image processing and the engine for adjusting timing for forming the image processing for image editing according to the printer engine 26. In addition, each image forming apparatus 400 needs not perform such coordination according to a mounted engine. Thus, development man-hours can be reduced.

Further, the image forming system 101 according to the first embodiment is configured such that the bridges of the non-transparent type (the PCI Express bridges 13 and 27) are connected to each other by the communication cable 300, and so host-to-host communication can be performed between the DFE apparatus 200 and the image forming apparatus 400. Thus, the problem in that a constraint is imposed on the start order of apparatuses at the time of system activation and the problem in that the system hangs up when the communication cable 300 falls out can be effectively avoided. Further, there is an effect capable of easily performing address translation when communication is performed between the DFE apparatus 200 and the image forming apparatus 400.

Further, in the image forming system 101 according to the first embodiment, the clock domain between the PCI Express bridges 13 and 27 is separated through the clock isolation function of the PCI Express bridges 13 and 27. Further, the non-spread spectrum clock is used as a clock in the clock domain between the PCI Express bridges 13 and 27, and the spread spectrum clock is used as a clock in the other clock domains. Thus, the EMI can be reduced, and appropriate synchronous communication can be performed between the DFE apparatus 200 and the image forming apparatus 400.

[Second Embodiment]

Next, a second embodiment will be described with reference to FIG. 13. In an image forming system according to the second embodiment (hereinafter, referred to as an "image forming system 102"), the image forming apparatus 400 is provided with a plurality of sets, each of which includes the frame memory 31 storing the raster image data transferred from a DFE apparatus 200 and the memory controller 32, in accordance with the number of sets into which color components of the raster image data are classified. The other configuration is the same as in the first embodiment, and thus the same components as in the first embodiment are denoted by the same reference numerals, and thus the redundant description will not be repeated.

Figure 13:
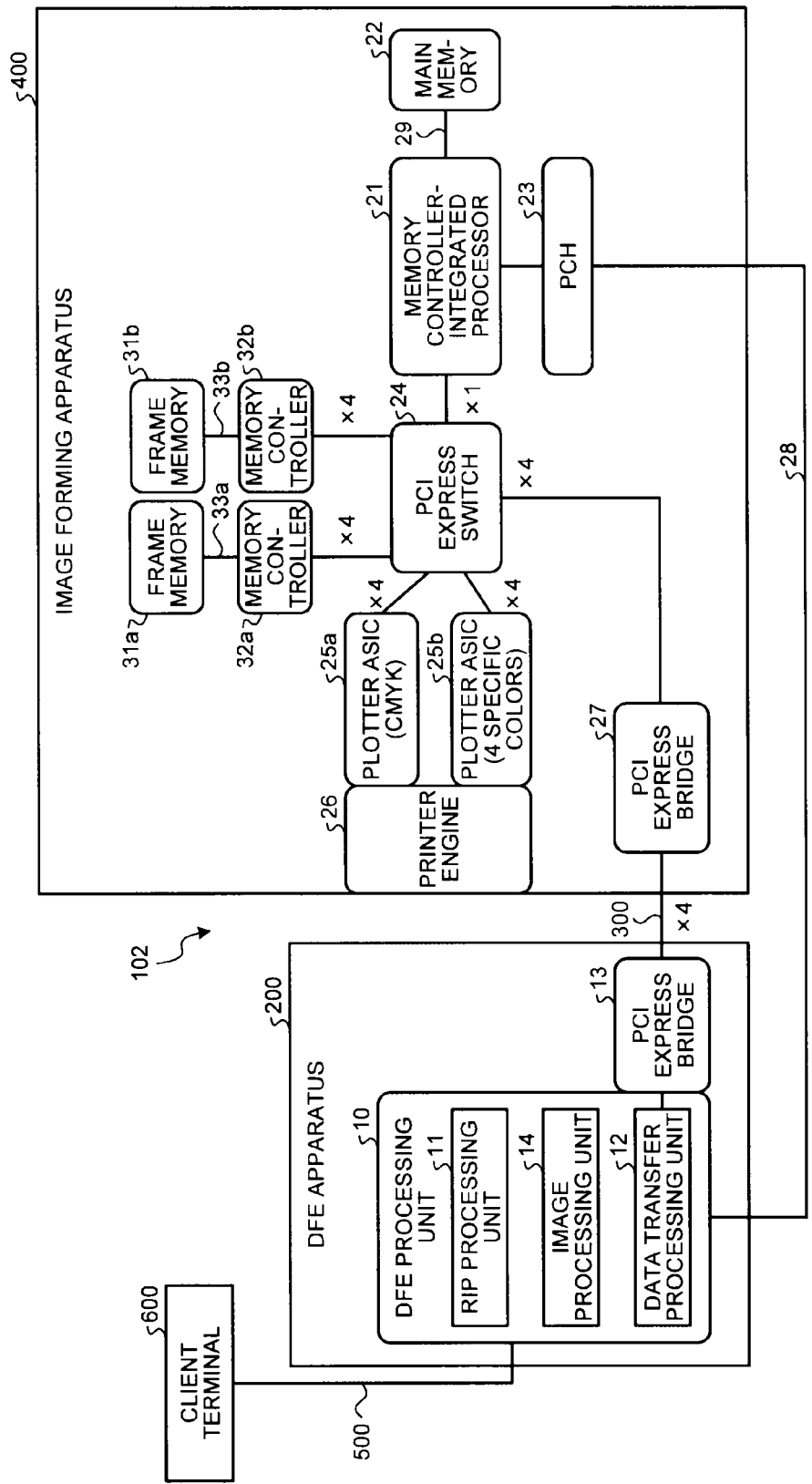
FIG. 13 is a diagram illustrating a schematic configuration of an image forming system according to a second embodiment.

FIG. 13 is a diagram illustrating a schematic configuration of the image forming system 102 according to the second embodiment. In the image forming system 102 according to the second embodiment, the image forming apparatus 400 is provided with two sets of frame memories and memory controllers (frame memories 31a and 31b and memory controllers 32a and 32b). Further, in the image forming system 102 according to the second embodiment, the plotter ASIC 25b corresponds to 4 specific colors, and color printing of a total of 8 colors including CMYK of the plotter ASIC 25*a* can be performed.

Here, a description will be made in connection with an example in which color components of a total of 8 colors of the raster image data are classified into two sets each including 4 colors, and two sets of frame memories 31 and the memory controllers 32 (frame memories 31*a* and 31*b* and memory controllers 32*a* and 32*b*) respectively corresponding to the sets of the color components are provided. However, color components of the raster image data may be classified into 3 or more sets, and 3 or more sets of frame memories 31 and memory controllers 32 respectively corresponding to the sets of the color components may be provided.

The frame memory 31*a* stores a part of the raster image data transferred from the DFE apparatus 200, page by page, which corresponds to color components of CMYK dealt by the plotter ASIC 25*a*. Further, the frame memory 31*b* stores a part of the raster image data transferred from the DFE apparatus 200, page by page, which corresponds to color components of 4 specific colors dealt by the plotter ASIC 25*b*. The frame memories 31*a* and 31*b* are connected to the memory controllers 32*a* and 32*b* through second memory buses 33*a* and 33*b*, respectively.

The memory controller 32*a* controls an operation of writing and reading the raster image data in and from the frame memory 31*a*. The memory controller 32*a* is connected to the frame memory 31*a* through the second memory bus 33*a* and connected to the PCI Express switch 24. The memory controller 32*b* controls an operation of writing and reading the raster image data in and from the frame memory 31*b*. The memory controller 32*b* is connected to the frame memory 31*b* through the second memory bus 33*b* and connected to the PCI Express switch 24.

The number of connection lanes between the memory controllers 32*a* and 32*b* and the PCI Express switch 24 is arranged so as to secure the same band as a band required by each of the two plotter ASICs 25*a* and 25*b*. In the second embodiment, each of the plotter ASICs 25*a* and 25*b* has 4 lane connections (×4), and so the number of connection lanes between each of the memory controllers 32*a* and 32*b* and the PCI Express switch 24 is set to 4 lane connections (×4).

Next, a description will be made in connection with the data flow of the raster image data in the image forming system 102 according to the second embodiment.

The raster image data generated by the RIP processing unit 11 of the DFE apparatus 200 is subjected to the image processing by the image processing unit 14, and then transferred to the image forming apparatus 400, page by page, through the PCI Express bridge 13 and the communication cable 300 in the uncompressed state by the memory write transfer process performed by the data transfer processing unit 12. Among the raster image data transferred from the DFE apparatus 200 to the image forming apparatus 400, the part of data corresponding to 4 colors of CMYK is input to the memory controller 32*a* through the PCI Express bridge 27 and the PCI Express switch 24. Then, the raster image data is written in the frame memory 31*a* by the memory controller 32*a*. Further, among the raster image data transferred from the DFE apparatus 200 to the image forming apparatus 400, the part of data corresponding to 4 specific colors is input to the memory controller 32*b* through the PCI Express bridge 27 and the PCI Express switch 24. Then, the raster image data is written in the frame memory 31*b* by the memory controller 32*b*.

At this time, the PCI Express switch 24 of the image forming apparatus 400 relays the transfer of the part of data corresponding to the 4 colors of CMYK between the PCI Express bridge 27 and the memory controller 32*a*. The memory controller 32*a* stores the part of data corresponding to the 4 colors of CMYK, which has been transferred from the DFE apparatus 200 through the communication cable 300, the PCI Express bridge 27, and the PCI Express switch 24, in the frame memory 31*a* through the second memory bus 33*a*.

At this time, the PCI Express switch 24 of the image forming apparatus 400 relays the transfer of the part of data corresponding to the 4 specific colors between the PCI Express bridge 27 and the memory controller 32*b*. The memory controller 32*b* stores the part of data corresponding to the 4 specific colors, which has been transferred from the DFE apparatus 200 through the communication cable 300, the PCI Express bridge 27, and the PCI Express switch 24, in the frame memory 31*b* through the second memory bus 33*b*.

After the data corresponding to the 4 colors of CMYK and the data corresponding to the 4 specific colors, which correspond to one page, are stored in the frame memories 31*a* and 31*b*, respectively, the plotter ASIC 25*a* of the image forming apparatus 400 reads the part of data corresponding to the 4 colors of CMYK from the frame memory 31*a*, line by line, in synchronization with the printing speed (the page feeding speed) of the printer engine 26 by the memory read transfer process, and transfers the read data to the printer engine 26. Further, the plotter ASIC 25*b* of the image forming apparatus 400 reads the part of data corresponding to the 4 specific colors from the frame memory 31*b*, line by line, in synchronization with the printing speed (the page feeding speed) of the printer engine 26 by the memory read transfer process, and transfers the read data to the printer engine 26.

At this time, the PCI Express switch 24 relays the transfer of the part of data corresponding to the 4 colors of CMYK between the memory controller 32*a* and the plotter ASIC 25*a*, and relays the transfer of the part of data corresponding to the 4 specific colors between the memory controller 32*b* and the plotter ASIC 25*b*. The plotter ASIC 25*a* acquires the part of data corresponding to the 4 colors of CMYK, which has been read from the frame memory 31*a* through the memory controller 32*a*, through the PCI Express switch 24, and supplies the printer engine 26 with the acquired data. Further, the plotter ASIC 25*b* acquires the part of data corresponding to the 4 specific colors, which has been read from the frame memory 31*b* through the memory controller 32*b*, through the PCI Express switch 24, and supplies the printer engine 26 with the acquired data.

As described above, in the image forming system 102 according to the second embodiment, the printing process is executed by simultaneously performing the process of writing the part of data corresponding to the 4 colors of CMYK and the part of data corresponding to the 4 specific colors among the raster image data in the frame memories 31*a* and 31*b*, page by page, and the process of reading the par of data corresponding to the 4 colors of CMYK and the part of data corresponding to the 4 specific colors from the frame memories 31*a* and 31*b*, line by line, and supplying the printer engine 26 with the read data in a parallel manner.

Even in the image forming system 102 according to the second embodiment, similarly to the first embodiment, the memory controller-integrated processor 21 does not use paths or memories (the frame memories 31*a* and 31*b*) to which the raster image data is transferred, when performing various processing with software. Thus, the line synchronization transfer performance of the printer engine 26 is not affected by an operation of software executed by the memory controller-integrated processor 21, and design limit performances of the plotter ASICs 25*a* and 25*b* and the printer engine 26 can be guaranteed. Accordingly, the image forming system 102 according to the second embodiment can perform an operation of writing and reading the raster image data in and from the frame memories 31a and 31b at a high speed and thus obtain high printing performance.

Further, the image forming system 102 according to the second embodiment is configured such that the image forming apparatus 400 is provided with a plurality of sets of frame memories and memory controllers, in accordance with the number of sets into which the color components of the raster image data are classified. Thus, when the number of colors printed by the printer engine 26 is increased, a plotter ASIC and a memory controller (and a frame memory) which are connected to the PCI Express switch 24 can be added, and thus there is an effect capable of obtaining high performance scalability.

[Third Embodiment]

Next, a third embodiment will be described with reference to FIG. 14. In an image forming system according to the third embodiment (hereinafter, referred to as an "image forming system 103"), the image forming apparatus 400 has a scanner function. The other configuration is the same as in the first embodiment, and thus the same components as in the first embodiment are denoted by the same reference numerals, and thus the redundant description will not be repeated.

Figure 14:
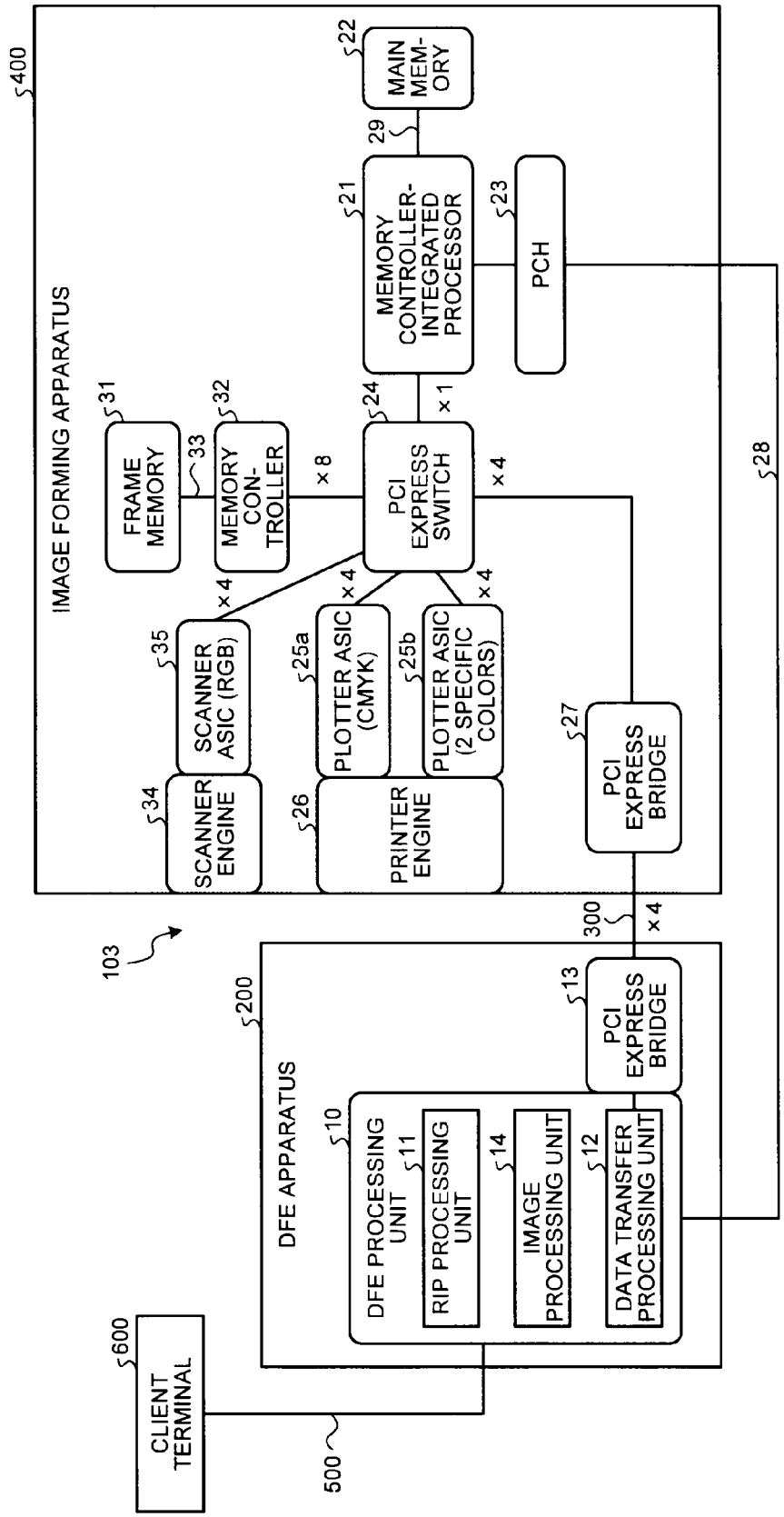
FIG. 14 is a diagram illustrating a schematic configuration of an image forming system according to a third embodiment.

FIG. 14 is a diagram illustrating a schematic configuration of the image forming system 103 according to the third embodiment. In the image forming system 103 according to the third embodiment, the image forming apparatus 400 further includes a scanner engine 34 and a scanner ASIC 35.

The scanner engine 34 optically scans an image of an original set on the image forming apparatus 400, and generates RGB data corresponding to the image of the original. The RGB data generated by the scanner engine 34 is supplied to the scanner ASIC 35, line by line.

The scanner ASIC 35 is connected to the PCI Express switch 24. The scanner ASIC 35 transfers the RGB data generated by the scanner engine 34 to the memory controller 32, line by line, via the PCI Express switch 24, in synchronization with a scan period of the scanner engine 34. The RGB data transferred to the memory controller 32 is written in the frame memory 31 through the second memory bus 33 as necessary. When the scanner engine 34 finishes an operation of scanning data corresponding to one page, raster image data corresponding to the image of the original is formed in the frame memory 31.

In the image forming system 103 according to the third embodiment, similarly to the first embodiment, not only the raster image data generated by the DFE apparatus 200 is transferred to the image forming apparatus 400 and stored in the frame memory 31, but also the raster image data of the image scanned by the scanner engine 34 of the image forming apparatus 400 is stored in the frame memory 31. The raster image data of the image scanned by the scanner engine 34 is read from the frame memory 31, and then transferred to the DFE apparatus 200 through a path opposite to the path through which the raster image data is transferred from the DFE apparatus 200 to the image forming apparatus 400.

Here, a description will be made in connection with the data flow in the image forming system 103 according to the third embodiment when the raster image data of the image scanned by the scanner engine 34 of the image forming apparatus 400 is transferred to the DFE apparatus 200. The data flow when the raster image data generated by the DFE apparatus 200 is transferred to the image forming apparatus 400 is the same as in the first embodiment.

The scanner ASIC 35 transfers RGB data of each line generated by the scanner engine 34 to the memory controller 32 through the PCI Express switch 24, and the RGB data is written in the frame memory 31 through the second memory bus 33 as necessary. At this time, the PCI Express switch 24 relays the transfer of the RGB data between the scanner ASIC 35 and the memory controller 32.

When the scanner engine 34 finishes an operation of scanning data corresponding to one page and the RGB data of all lines configuring one page are stored in the frame memory 31, the raster image data corresponding to the image of the original is formed in the frame memory 31.

After the raster image data corresponding to one page, which corresponds to the image of the original scanned by the scanner engine 34, is stored in the frame memory 31, the DFE apparatus 200 reads the raster image data corresponding to the image of the original from the frame memory 31 by the memory read transfer process. The raster image data read from the frame memory 31 is transferred to the DFE apparatus 200 through the PCI Express switch 24, the PCI Express bridge 27, and the communication cable 300, page by page. At this time, the PCI Express switch 24 of the image forming apparatus 400 relays the transfer of the raster image data between the memory controller 32 and the PCI Express bridge 27.

The raster image data transferred from the image forming apparatus 400 to the DFE apparatus 200 is input to the DFE processing unit 10 through the PCI Express bridge 13, is subjected to the image processing by the image processing unit 14 as necessary, and then is delivered to the client terminal 600 through the network 500.

The above description has been made in connection with the example in which data of an image scanned by the scanner engine 34 of the image forming apparatus 400 is delivered to the client terminal 600. However, when an application for executing a copying function is installed, an image scanned by the scanner engine 34 can be printed through the printer engine 26. In this case, the raster image data (RGB data) transferred from the image forming apparatus 400 to the DFE apparatus 200 may be converted into data of a CMYK format by the DFE processing unit 10. Then, the data of the CMYK format may be subjected to the image processing by the image processing unit 14 as necessary, and then transferred to the image forming apparatus 400 through the above described path. Then, the data may be written back in the frame memory 31 and supplied to the printer engine 26, line by line.

Even in the image forming system 103 according to the third embodiment, similarly to the first and the second embodiment, the memory controller-integrated processor 21 does not use a path or a memory (the frame memory 31) to which the raster image data is transferred, when performing various processing with software. Thus, the line synchronization transfer performance of the printer engine 26 is not affected by an operation of software executed by the memory controller-integrated processor 21, and design limit performances of the plotter ASICs 25a and 25b and the printer engine 26 can be guaranteed. Accordingly, the image forming system 103 according to the third embodiment can perform an operation of writing and reading the raster image data in and from the frame memory 31 at a high speed and thus obtain high printing performance.

Further, in the image forming system according to the third embodiment 103, the scanner function is added to the image forming apparatus 400 as described above. Thus, not only convenience is improved, but also the data transfer of the image scanned by the scanner engine 34 is not affected by processing performed by the memory controller-integrated processor 21. As a result, there is an effect capable of executing the scanner function and the printing process at high performance in a parallel manner.

[Fourth Embodiment]

Next, a fourth embodiment will be described with reference to FIG. 15. In an image forming system according to the fourth embodiment (hereinafter, referred to as an "image forming system 104"), the memory controller 32 is built in the PCI Express switch 24. The other configuration is the same as in the first embodiment, and thus the same components as in the first embodiment are denoted by the same reference numerals, and thus the redundant description will not be repeated.

Figure 15:
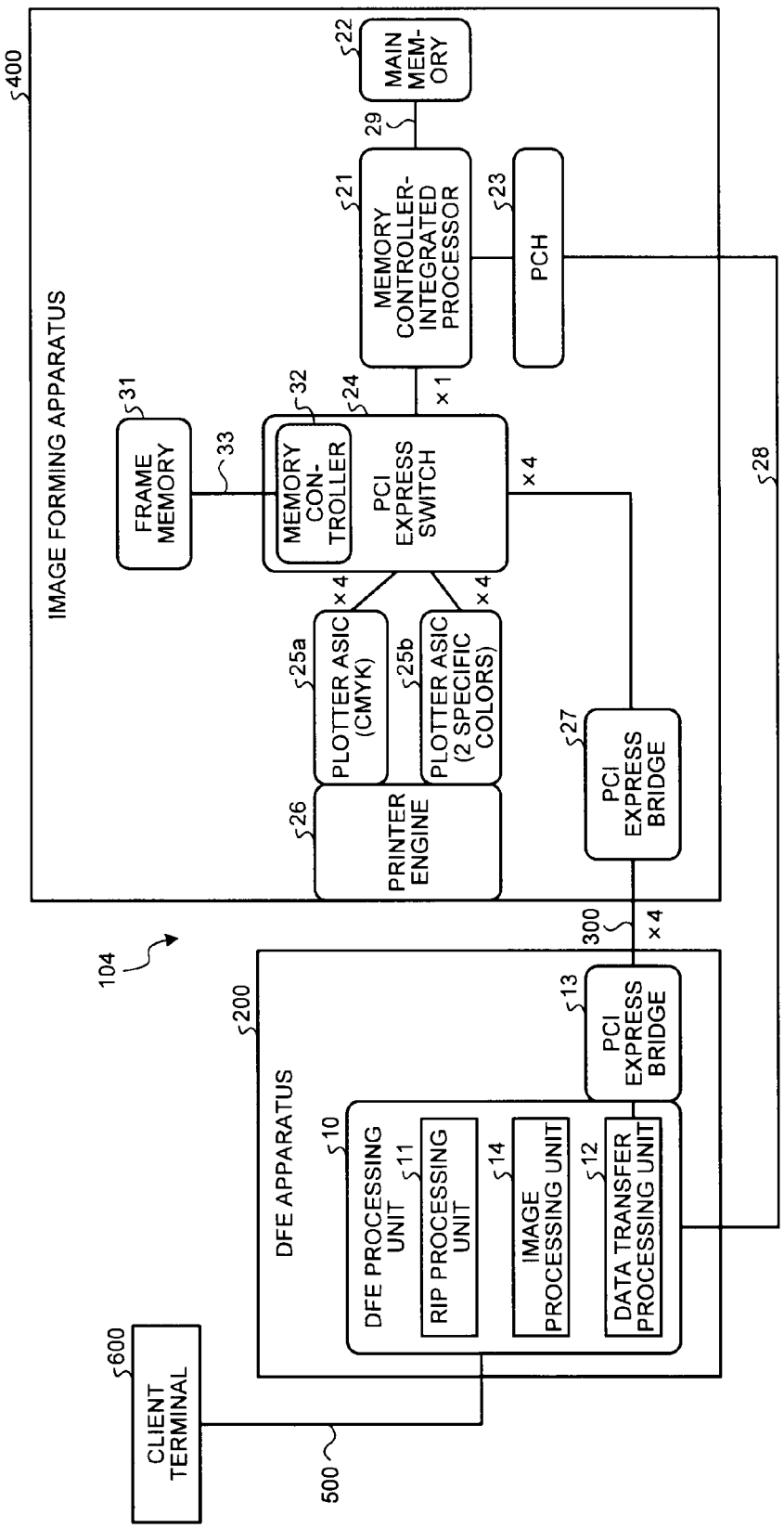
FIG. 15 is a diagram illustrating a schematic configuration of an image forming system according to a fourth embodiment.

FIG. 15 is a diagram illustrating a schematic configuration of the image forming system 104 according to the fourth embodiment. In the image forming system 104 according to the fourth embodiment, the memory controller 32 that controls an operation of writing and reading the raster image data in and from the frame memory 31 is mounted as an internal function of the PCI Express switch 24. The PCI Express switch 24 including the memory controller 32 as its internal function may be implemented, for example, using an ASIC including a plurality of PCI Express connection ports and a DDR memory bus (the second memory bus 33), or a general-purpose high-speed FPGA mounted with a high-speed IO compatible with a plurality of PCI Express connection ports and a DDR memory bus.

The data flow in the image forming system 104 according to the fourth embodiment is basically similar to the first embodiment. However, in the image forming system 104 according to the fourth embodiment, since the memory controller 32 is built in the PCI Express switch 24, the number of PCI Express links through which packets of the raster image data pass is one step smaller than that in the first embodiment.

For this reason, in the image forming system 104 according to the fourth embodiment, the number of times when the packets of the raster image data are converted by the PCI Express protocol is smaller than the first embodiment. Thus, the response delay time is further reduced by that much, and so the line transfer time of the printer engine 26 can be further reduced. Thus, the image forming system 104 according to the fourth embodiment can further improve the printing performance of the printer engine 26.

Further, in the image forming system 104 according to the fourth embodiment, when performance is desired to be improved by increasing the number of plotter ASICs or adding the scanner ASIC as in the third embodiment, the number of frame memories can be increased as in the second embodiment, or memory controllers respectively corresponding to the frame memories can be built in the PCI Express switch 24, whereby there is an effect capable of obtaining high performance scalability.

[Fifth Embodiment]

In conventional image forming apparatuses, there was a problem in that it is difficult to secure an address space of a local memory having the size enough to store the RIP data developed by the DFE apparatus with the increase in the image data. A technique of introducing a 64-bit OS may be considered in order to secure the address space having the sufficient size. In this technique, however, with the introduction of the 64-bit OS, the entire system such as an image processing controller needs to be configured to support 64-bit addresses. For this reason, a technical problem is large, and it was problematic in terms of development man-hours and cost.

According to the fifth embodiment, an address space of a memory storing data received from an external device can be easily secured.

Figure 16:
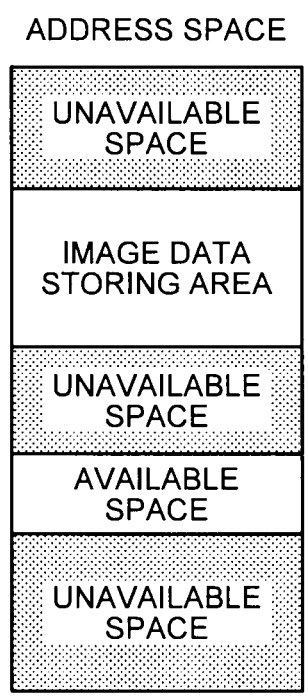
FIG. 16 is a diagram illustrating an example of an address space managed by a processor according to a comparative example.

FIG. 16 is a diagram illustrating an example of an address space (a first address space) managed by the memory controller-integrated processor 21 of the image forming system 110 according to the comparative example. The first address space includes an address space of the main memory 22. Typically, in case of a 32-bit OS, a supported memory size is limited to 4 GB or less. Since an address space is allocated to a system device which is in use, an area (an image data storing area) of the main memory 22 available for storing image data is further limited by the address space allocated to the system device. Further, depending on the system, an available area may be further segmented.

In this case, it is difficult to secure an area of a large consecutive address as an area for storing image data sent from the DFE apparatus 200.

In this regard, the image forming apparatus according to the present embodiment is provided with a frame memory (a second memory) for storing image data developed by the DFE apparatus 200, separately from the main memory 22 used for working of the memory controller-integrated processor 21. An address space of the frame memory is separated from the main memory 22. The data, which is transferred from the DFE apparatus 200 in units smaller than original image data size, is developed and then stored in the frame memory.

Figure 17:
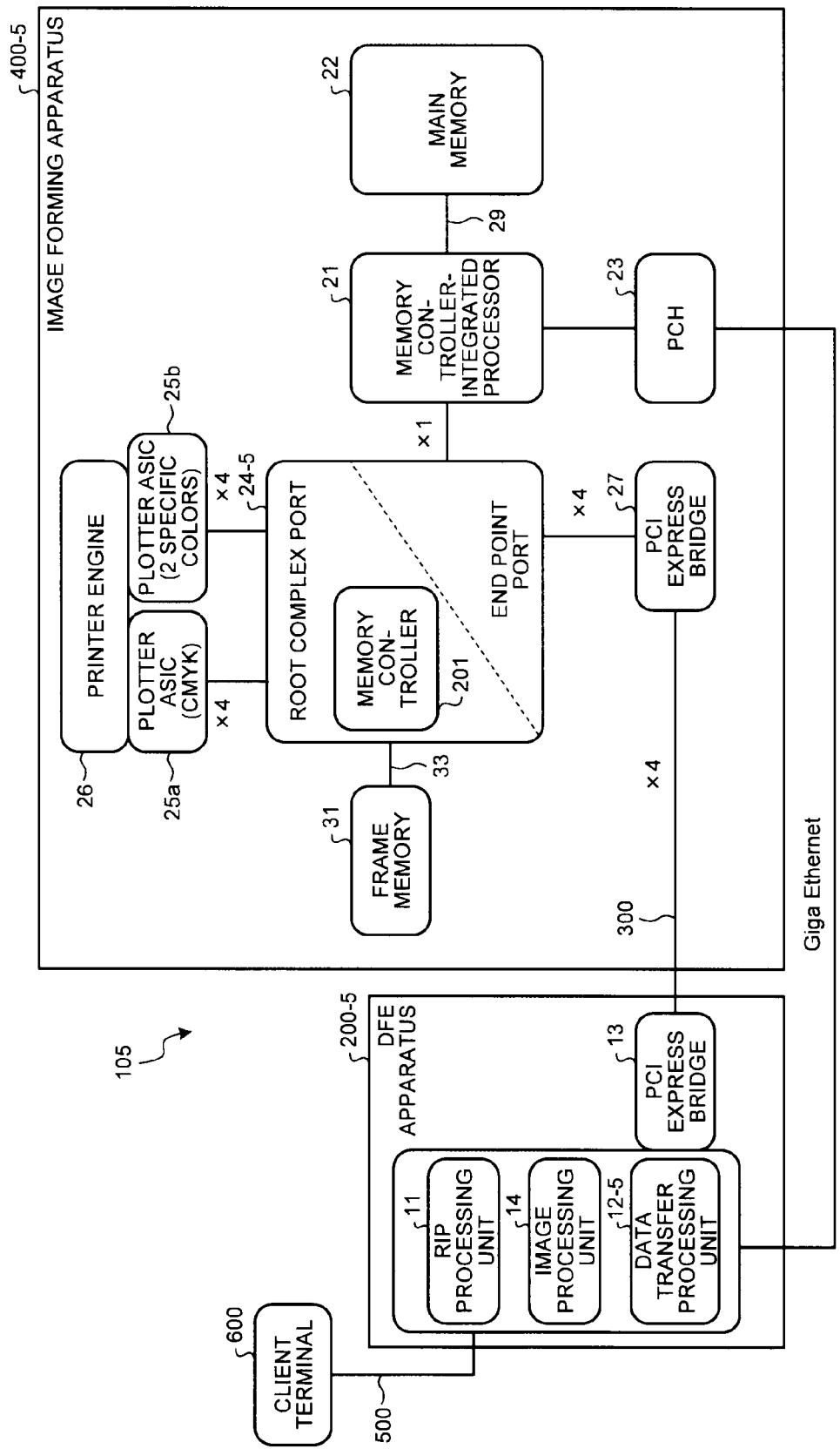
FIG. 17 is a diagram illustrating an example of an image forming system according to a fifth embodiment.

FIG. 17 is a diagram illustrating an example of the image forming system according to the present embodiment. The image forming system according to the present embodiment includes a DFE apparatus 200-5, an image forming apparatus 400-5, and a printer engine 26.

The DFE apparatus 200-5 differs from the DFE apparatuses 200 of the first to fourth embodiments in a function of a data transfer processing unit 12-5. The data transfer processing unit 12-5 differs from the data transfer processing unit 12 of FIG. 1 in that the data transfer processing unit 12-5 transfers data, which is obtained by dividing image data into data of a predetermined size, to the image forming apparatus 400-5. The predetermined size may be arbitrarily set. For example, the size corresponding to one address, the size (a line size) corresponding to one line, or the size corresponding to a plurality of lines may be set as the predetermined size. A description will be made below in connection with an example in which the line size is used as the predetermined size.

The image forming apparatus 400-5 further includes a frame memory 31 capable of storing the raster image data page by page. A memory controller-integrated processor 21 is connected to a PCI Express switch 24-5 on which a memory controller 201 for processing memory access control to the frame memory 31 is mounted. The frame memory 31 is connected to the PCI Express switch 24-5.

The PCI Express switch 24-5 may be implemented using an ASIC including a plurality of PCI Express connection ports and a DDR memory bus or a general-purpose high-speed FPGA mounted with and a high-speed IO compatible with a plurality of PCI Express port implementations and a DDR memory bus.

Further, the plotter ASICs 25a and 25b are connected to a root complex port of the PCI Express switch 24-5. Typically, two root complexes can not exist in one PCI Express device tree. For this reason, address translation needs to be performed in order to transmit and receive data between the root complex port and an end point port of the PCI Express switch 24-5. Thus, it can be seen as if the root complex port of the PCI Express switch 24-5 is hidden when viewed from the memory controller-integrated processor 21. In this way, the address space of the frame memory 31 can be separated from the main memory 22.

Further, the number of connection lanes between the memory controller-integrated processor 21 and the PCI Express switch 24-5 is set to a minimal one lane connection (×1). It is because in a link of this portion, the memory controller-integrated processor 21 only transfers data as small as "config packet" for the PCI Express bridge 27 or the PCI Express switch 24-5, but does not transfer a large amount of raster image data.

Figure 18:
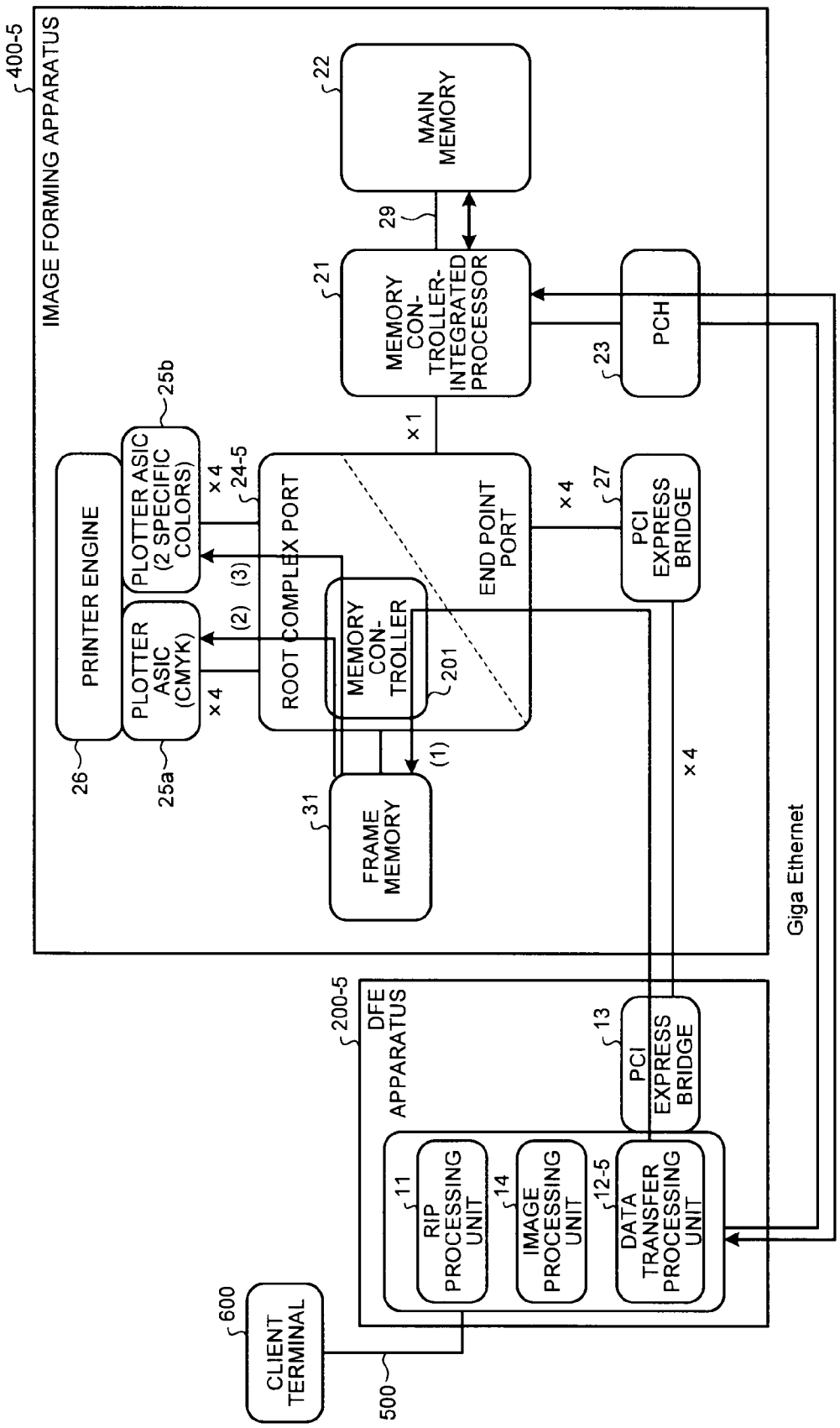
FIG. 18 is a diagram for describing the flow of data in the image forming system according to the fifth embodiment.

FIG. 18 is a diagram for describing an image flow of the image forming apparatus 400-5 according to the present embodiment. Functions of the respective components and an image data flow at the time of the printing process will be described below with reference to FIG. 18 ((1) to (7)).

(1) The client terminal 600 is connected to the DFE apparatus 200-5 through a network 500 such as LAN, and transfers a print job according to a PDL to the DFE apparatus 200-5. Here, a network connection form is not limited to the LAN.

(2) The RIP processing unit 11 develops data of a PDL format contained in the print job received from the client terminal 600 into raster image data for printing.

(3) The image processing unit 14 performs image data correction for printing on the developed raster image data.

(4) The data transfer processing unit 12-5 transfers the corrected raster image data to the image forming apparatus 400-5 through PCI Express cable (×4 lanes) and the PCI Express bridge 27 by the memory write transfer process. Here, the number of PCI Express lanes is arranged so as to obtain a sufficient transfer band, depending on the size of the image data and the printing process speed. In this description, an ×4 lane connection is used.

(5) The image data transfer is performed in units of predetermined sizes divided from a print page. The timing control for starting a data transfer is performed through a Giga Ethernet (a registered trademark) connected with the image forming apparatus 400-5. Meanwhile, the timing control for transferring a predetermined size data with the DFE apparatus 200-5 is performed by the memory controller-integrated processor 21 of the image forming apparatus 400-5 through a PCH 23 connected to the Giga Ethernet (a registered trademark).

(6) The raster image data transferred to the image forming apparatus 400-5 is further transferred to the memory controller 201 through the PCI Express bridge 27 connected to the PCI Express cable (×4 lanes) and the PCI Express switch 24-5, and then stored in the frame memory 31 (an arrow (1) in FIG. 18).

(7) After the raster image data corresponding to one page is stored in the frame memory 31, the plotter ASICs 25*a* and 25*b* of the image forming apparatus 400-5 read out the raster image data from the frame memory 31 by a memory read transfer process via the PCI Express switch 24-5 (arrows (2) and (3) in FIG. 18). In the memory transfer process, the raster image data is read out from the frame memory line by line (a size unit corresponds to a line in the main scanning direction of recording medium such as paper), in synchronization with the printing speed (feeding speed of recording medium such as paper) of the printer engine 26.

As described above, the printing process is executed by simultaneously performing the process of writing the raster image page data in the frame memory 31 and the process of reading the raster image line data from the frame memory 31 to the printer engine 26 in a parallel manner.

In the image forming apparatus 400-5 according to the present embodiment, software of the memory controller-integrated processor 21 does not use a transfer path or a memory for the raster image data. Thus, the line synchronization transfer performance of the printer engine 26 is not affected by an operation of software, and design limit performances of the plotter ASICs 25*a* and 25*b* and the printer engine 26 can be fully guaranteed.

Figure 19:
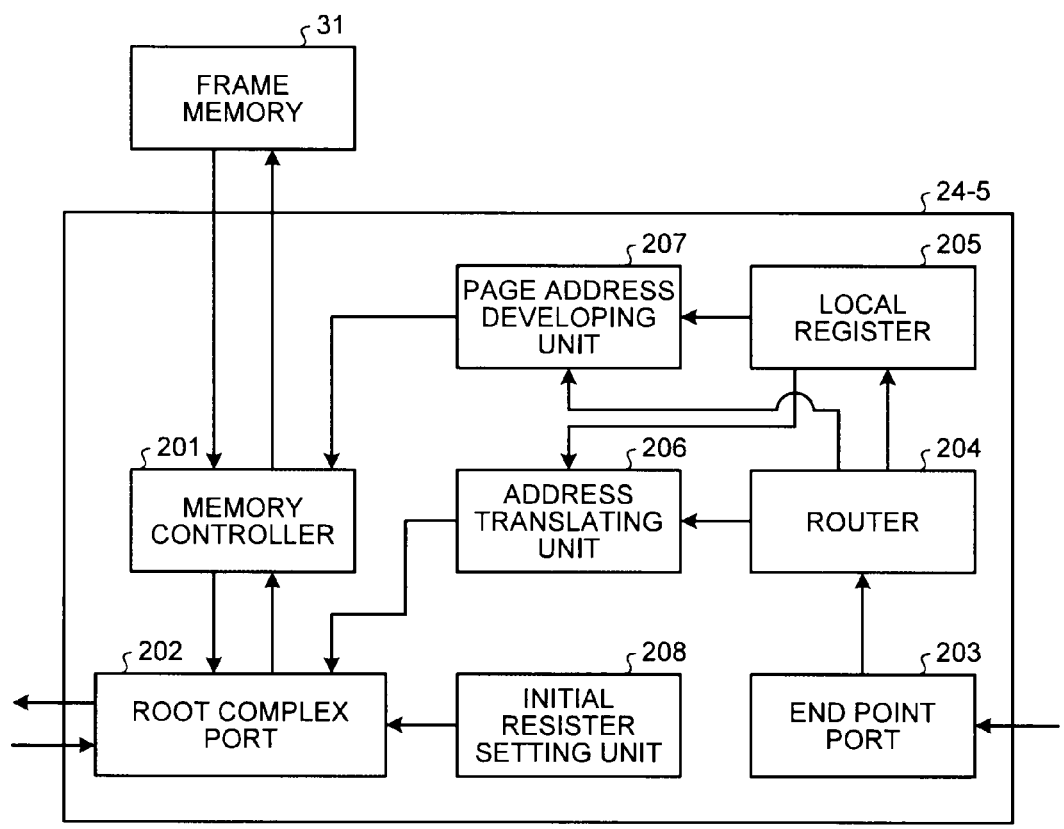
FIG. 19 is a block diagram illustrating an example of a schematic configuration of an internal circuit of a PCI Express switch according to the fifth embodiment.

Next, a description will be made in connection the outline of an internal circuit of the PCI Express switch 24-5. FIG. 19 is a block diagram illustrating a schematic configuration example of an internal circuit of the PCI Express switch 24-5.

The PCI Express switch 24-5 includes the memory controller 201, a root complex port 202, an end point port 203, a router 204, a local register 205, an address translating unit 206, a page address developing unit 207 functioning as a calculating unit, and an initial resister setting unit 208.

The memory controller 201 controls memory access to the frame memory 31 as described above. The router 204 allocates a transfer destination of data according to the type of corresponding data. For example, when the raster image data is received, the router 204 transfers the received raster image data to the page address developing unit 207. When any other data is received, the router 204 transfers the received data to the address translating unit 206.

The local register 205 stores a translation table, a line size, the number of lines, and the like. The address translating unit 206 performs address translation between an address space of the end point and an address space of the root complex on the basis of the translation table in order to connect the end point with the root complex. In the present embodiment, since the memory controller-integrated processor 21 functions as the end point, the first address space managed by the memory controller-integrated processor 21 functions as the address space of the end point. The address space (a second address space) of the root complex includes an address space of the frame memory 31.

The page address developing unit 207 develops image data to be transferred to a designated predetermined address into a page address. The page address refers to an address in the address space of the frame memory 31 of the image data corresponding to one page stored in the frame memory 31. The page address developing unit 207 calculates an address in the page address so that the image data (input data) transferred with the predetermined size (the line size) can be stored in the frame memory 31 while being shifted by the predetermined size. For example, each time when input data is received, the page address developing unit 207 calculates an address obtained by adding the line size to an address at which immediately previous input data is stored as an address used for storing the input data. The page address developing unit 207 reads the line size from the local register 205 and uses the read line size. Further, the page address developing unit 207 reads the number of lines inside one page from the local register 205, and determines that image data corresponding to one page has been stored when the number of stored input data reaches the number of lines. In this case, for example, the page address developing unit 207 calculates an address of received input data as an initial value (a beginning address of an area storing image data of one page).

The initial resister setting unit 208 performs initial register setting of the plotter ASICs 25*a* and 25*b* at the time of linkup. When the image forming apparatus 400-5 starts, the initial resister setting unit 208 performs register setting of the plotter ASICs 25*a* and 25*b*. Further, after linkup, the memory controller-integrated processor 21 can change register setting of the plotter ASICs 25*a* and 25*b* through the address translating unit 206.

Figure 20:
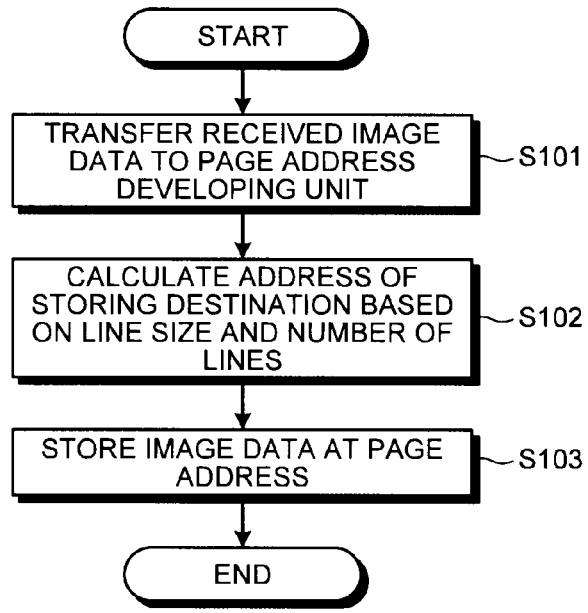
FIG. 20 is a flowchart illustrating the overall flow of a data storing process according to the fifth embodiment.

Next, a data storing process by the above configuration according to the present embodiment will be described with reference to FIG. 20. FIG. 20 is a flowchart illustrating the overall flow of the data storing process according to the present embodiment. The data storing process of FIG. 20 is a process from when the PCI Express switch 24-5 receives image data divided into the predetermined size (the line size) from the DFE apparatus 200-5 to when the received data is stored in the frame memory 31.

First, in step S101, when image data (input data) of the line size received through the end point port 203 is received, the router 204 of the PCI Express switch 24-5 transfers the received input data to the page address developing unit 207. In step S102, the page address developing unit 207 calculates an address used for storing the input data with reference to the line size and the number of lines stored in the local register 205. In step S103, the memory controller 201 designates the calculated address, and stores the input data in the frame memory 31.

The DFE apparatus 200-5 designates a predetermined address in the address space (the first address space) managed by the memory controller-integrated processor 21, and requests the image forming apparatus 400-5 to write input data of a predetermined size. As a result, an area of a large consecutive address needs not be secured in the address space of the main memory 22 as an image data storing area. The predetermined address may be a fixed address or an address designated, for example, for each image forming apparatus 400-5. That is, as the predetermined address, there may be used as an address indicating an area capable of storing data of a unit smaller than original image data, like an address used for storing data of a line unit.

When data written at a predetermined address is stored in the frame memory 31 "as is", it is difficult for the plotter ASICs 25a and 25b to accurately read the data. In this regard, in the present embodiment, the page address developing unit 207 develops data written at a predetermined address into an address of a page unit (a page address). The page address developing unit 207 can accurately develop data in view of the line size and the number of lines.

Figure 21:
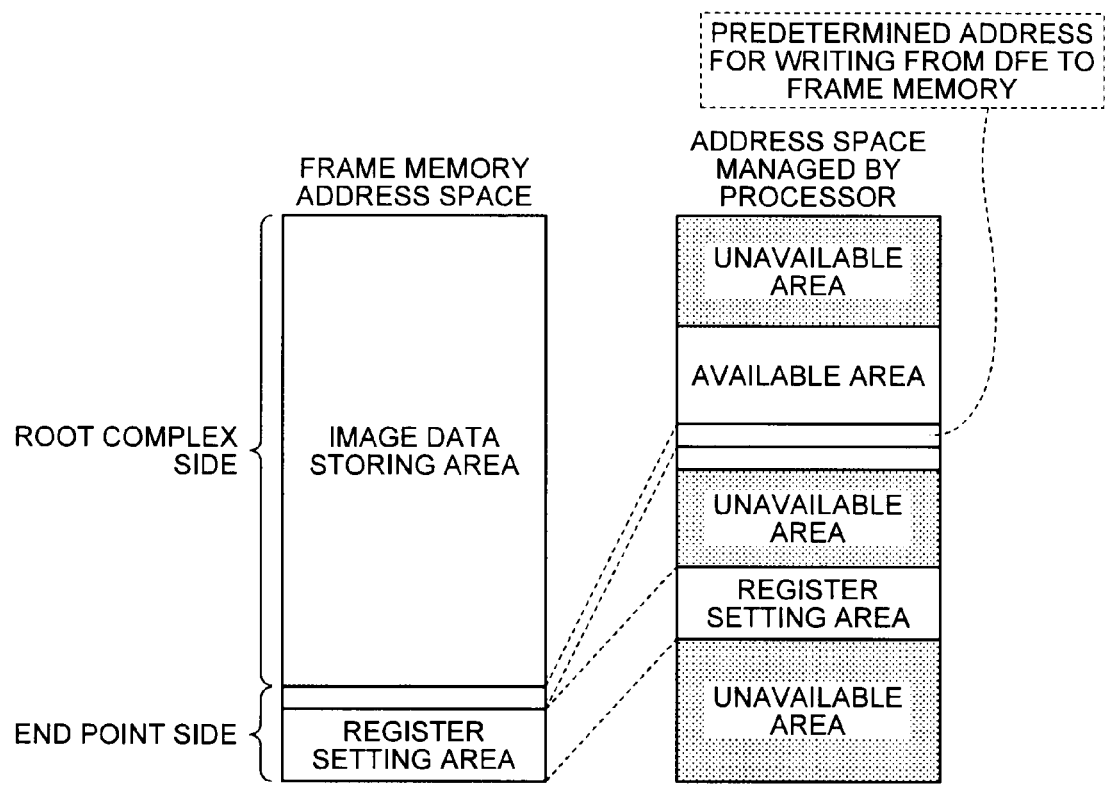
FIG. 21 is a diagram illustrating an example of a correspondence relation between an address space of a frame memory and an address space managed by a processor according to the fifth embodiment.

FIG. 21 is a diagram illustrating an example of a correspondence relation between the address space of the frame memory 31 and the address space (the first address space) managed by the memory controller-integrated processor 21. As described above, the address space of the frame memory 31 is included in the address space (the second address space) of the root complex.

The main memory 22 needs an area (a register setting area) for register setting of the plotter ASICs 25a and 25b as an area corresponding to an end point side area, and a predetermined address for image data to be written from the DFE apparatus 200-5. However, since they are solved by very small areas, the areas can be easily secured.

Further, the address space of the frame memory 31 is divided into a space at the root complex side and a space at the end point side. A register setting area and a predetermined address for DFE writing are allocated to the address space at the end point side, similarly to the main memory 22. Further, in the address space at the root complex side, a large consecutive area can be secured as an image data storing area in a form separated from the main memory 22. Thus, image data developed into an address of a page unit can be stored in the image data storing area.

Hereinbefore, the first to fifth embodiments have been described as the concrete embodiments of the present invention. However, the present invention is not limited to the above embodiments as is, and in the implementation stage, the components may be modified in a range not departing from the gist of the present invention. For example, the above embodiments have been described in connection with the example in which the transfer of the raster image data is performed according to the protocol of the PCI Express standard, but the data transfer system is not limited thereto.

Further, various inventions can be derived by appropriately combining a plurality of components disclosed in the above embodiments. For example, several components may be excluded from among all components described in the embodiments. Further, components of different embodiments may be appropriately combined.

Further, a program executed by an apparatus according to the embodiments may be provided in a form previously embedded in a read only memory (ROM) or the like.

A program executed by an apparatus according to the embodiments may be a file having an installable format or an executable format. The program may be recorded on a computer readable storage medium such as a compact disc read only memory (CD-ROM), a flexible disk (FD), a compact disc rewritable (CD-R), and a digital versatile disk (DVD) and provided as a computer program product.

In addition, a program executed by an apparatus according to the embodiments may be stored in a computer connected to a network such as the Internet and provided by downloading through the network. Further, a program executed by an apparatus according to the embodiments may be provided or distributed through a network such as the Internet.

A program executed by an apparatus according to the embodiments may have a module configuration including the above described components. In actual hardware, by reading out and executing the program from a ROM through a CPU (a processor), the above described components may be loaded onto a main storage device and generated on the main storage device.

The image forming apparatus of the present invention can be applied to not only an MFP having at least two functions of a copying function, a printer function, a scanner function, and a facsimile function but also any image forming apparatus such as a copying machine, a printer, a scanner device, and a facsimile machine.

According to the present invention, there is an effect capable of performing an operation of writing and reading the raster image data to and from the memory at a high speed and obtaining high printing performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that receives raster image data transferred from an external device and forms an image on the basis of the received raster image data, the raster image data being created by the external device, the apparatus comprising:

a first memory that stores therein software;
a processor that executes the software stored in the first memory;
a second memory that stores the received raster image data;
a memory control unit that is connected to the second memory through a bus and controls an operation of writing and reading the raster image data in and from the second memory;
a switch that is connected to both the processor and the memory control unit;

a printer engine that forms an image on the basis of the raster image data; and an engine control unit that is connected to the switch and that supplies the raster image data from the second memory through the memory control unit to the printer engine, wherein at least one of the memory control unit, the switch, and the engine control unit is separate from the processor.

2. The image forming apparatus according to claim 1, further comprising:

a bridge that is connected to the external device through a cable and receives the raster image data transferred from the external device through the cable, wherein the switch relays a transfer of the raster image data from the bridge to the memory control unit and a transfer of the raster image data from the memory control unit to the engine control unit.

3. The image forming apparatus according to claim 2, wherein the cable, the bridge, and the switch conform to a PCI Express standard.

4. The image forming apparatus according to claim 2, wherein the memory control unit is built in the switch.

5. The image forming apparatus according to claim 1, wherein a plurality of sets each including the second memory and the memory control unit are provided, corresponding to the number of sets into which color components of the raster image data are classified.

6. The image forming apparatus according to claim 1, further comprising:

a scanner engine that scans an image; and a scanner control unit that writes data of the image scanned by the scanner engine in the second memory through the memory control unit.

7. An image forming system comprising a first apparatus that generates raster image data and a second apparatus that forms an image on the basis of the raster image data transferred from the first apparatus, wherein the first apparatus includes a generating unit that generates the raster image data on the basis of a print job, an image processing unit that performs image processing to edit the raster image data generated by the generating unit, and a transfer unit that transfers the raster image data that has been subjected to the image processing to the second apparatus, and the second apparatus includes a first memory that stores therein software, a processor that executes the software stored in the first memory, a second memory that stores the raster image data received from the first apparatus, a memory control unit that is connected to the second memory through a bus and controls an operation of writing and reading the raster image data in and from the second memory, a switch that is connected to both the processor and the memory control unit, a printer engine that forms an image on the basis of the raster image data, and an engine control unit that is connected to the switch and that supplies the raster image data from the second memory through the memory control unit to the printer engine, wherein at least one of the memory control unit, the switch, and the engine control unit is separate from the processor.

8. The image forming system according to claim 7, wherein the first apparatus is connected to the second apparatus through a cable, the first apparatus further includes a first bridge to which the raster image data to be transferred to the second apparatus through the cable is input, the second apparatus further includes a second bridge to which the raster image data transferred from the first apparatus through the cable is input, and the switch relays a transfer of the raster image data from the second bridge to the memory control unit and a transfer of the raster image data from the memory control unit to the engine control unit.

9. The image forming system according to claim 8, wherein the cable, the first bridge, the second bridge, and the switch conform to a PCI Express standard.

10. The image forming system according to claim 7, wherein the raster image data is transferred from the first apparatus to the second apparatus in an uncompressed state.

11. The image forming system according to claim 7, wherein the first apparatus further includes a receiving unit that receives a print job transmitted from a client terminal through a network, and the generating unit analyzes print data included in the print job received by the receiving unit and generates the raster image data.

12. An image forming apparatus, comprising:

a processor;

a first memory that is accessed by the processor;

a second memory that stores data;

a relay unit that is connected to the processor and the second memory and transmits image data received from an external device to either of the processor and the second memory; and an image forming unit that forms an image a medium on the basis of the image data, wherein the relay unit includes an address translating unit that performs an address translation between a first address space including an address space of the first memory and a second address space including an address space of the second memory, the relay unit stores, in the second memory, the image data in units of predetermined size smaller than the second memory size, a write request of which is issued from the external device with respect to a predetermined address contained in the first address space, while shifting the address by the predetermined size, and the relay unit outputs the stored image data to the image forming unit when an amount of the input image data corresponding to the original image data size is stored in the second memory.

13. The image forming apparatus according to claim 12, wherein the relay unit is a switch conforming to a PCI Express standard, and further includes a first port functioning as an end point port connected with the processor and a second port connected with a root complex, and the address translating unit performs address translation between the first address space including the address space of the first memory that is an address space of the first port and the second address space including the address space of the second memory that is an address space of the second port.

14. The image forming apparatus according to claim 12, wherein the relay unit further includes a calculating section that calculates an address obtained by adding the predetermined size to an immediately previous address at which data is stored in the second memory as an address used for storing the input data from the external device.

15. The image forming apparatus according to claim 1, wherein the switch relays a transfer of the raster image data to the memory control unit and a transfer of the raster image data from the memory control unit to the engine control unit.

16. The image forming apparatus according to claim 2, wherein the switch conforms to a PCI Express standard.

17. The image forming apparatus according to claim 1, wherein at least one of the memory control unit and the engine control unit is separate from the processor.

18. The image forming apparatus according to claim 1, wherein the memory control unit is separate from the processor.

19. The image forming apparatus according to claim 1, wherein the memory control unit and the switch are separate from the processor.

20. The image forming apparatus according to claim 1, wherein the memory control unit, the switch, and the engine control unit are separate from the processor.

* * * * *